United States Patent
Mage et al.

(10) Patent No.: US 12,320,703 B2
(45) Date of Patent: *Jun. 3, 2025

(54) METHODS FOR SPECTRALLY RESOLVING FLUOROPHORES OF A SAMPLE AND SYSTEMS FOR SAME

(71) Applicant: Becton, Dickinson and Company, Franklin Lakes, NJ (US)

(72) Inventors: Peter Mage, San Jose, CA (US); Keegan Owsley, Campbell, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,968

(22) Filed: Jun. 5, 2024

(65) Prior Publication Data

US 2024/0369411 A1 Nov. 7, 2024

Related U.S. Application Data

(63) Continuation of application No. 17/975,243, filed on Oct. 27, 2022, now Pat. No. 12,038,326, which is a
(Continued)

(51) Int. Cl.
*G01J 3/44* (2006.01)
*G01N 21/64* (2006.01)

(52) U.S. Cl.
CPC ........ *G01J 3/4406* (2013.01); *G01N 21/6428* (2013.01); *G01N 21/6486* (2013.01)

(58) Field of Classification Search
CPC .............. G01J 3/4406; G01N 21/6428; G01N 21/6486
See application file for complete search history.

(56) References Cited

U.S. PATENT DOCUMENTS 6,897,954 B2   5/2005   Bishop et al.
7,280,204 B2   10/2007   Robinson et al.
(Continued)

FOREIGN PATENT DOCUMENTS

CN   101399803 A   9/2007
EP   1990630 A1   9/2015
(Continued)

OTHER PUBLICATIONS

Dickinson, et al. "Multi-Spectral Imaging and Linear Unmixing Add a Whole New Dimension to Laser Scanning Fluorescence Microscopy", BioTechniques, vol. 31, No. 6, (2001), 5 pages.
(Continued)

*Primary Examiner* — Jamil Ahmed
(74) *Attorney, Agent, or Firm* — Bret E. Field; BOZICEVIC, FIELD & FRANCIS LLP

(57) ABSTRACT

Aspects of the present disclosure include methods for spectrally resolving light from fluorophores having overlapping fluorescence spectra in a sample. Methods according to certain embodiments include detecting light with a light detection system from a sample having a plurality of fluorophores having overlapping fluorescence spectra and spectrally resolving light from each fluorophore in the sample. In some embodiments, methods include estimating the abundance of one or more of the fluorophores in the sample, such as on a particle. In certain instances, methods include identifying the particle in the sample based on the abundance of each fluorophore and sorting the particle. Methods according to some embodiments includes spectrally resolving the light from each fluorophore by calculating a spectral unmixing matrix for the fluorescence spectra of each fluorophore. Systems and integrated circuit devices (e.g., a field programmable gate array) for practicing the subject methods are also provided.

12 Claims, 2 Drawing Sheets

- As the red block is computationally expensive, in some embodiments the red block is not in the FPGA loop
- As the green blocks are computationally cheap, in some instances the green blocks are in the FPGA loop

Related U.S. Application Data continuation of application No. 17/225,730, filed on Apr. 8, 2021, now Pat. No. 11,543,295, which is a continuation of application No. 16/725,799, filed on Dec. 23, 2019, now Pat. No. 11,009,400.

(60) Provisional application No. 62/924,999, filed on Oct. 23, 2019, provisional application No. 62/803,975, filed on Feb. 11, 2019, provisional application No. 62/786,186, filed on Dec. 28, 2018.

(56) References Cited

U.S. PATENT DOCUMENTS

| | | | |
|---|---|---|---|
| 7,451,173 | B1 | 11/2008 | Van Benthem |
| 7,522,758 | B2 | 4/2009 | Ortyn et al. |
| 8,443,031 | B1 | 5/2013 | Rao |
| 8,825,431 | B2 | 9/2014 | Kato et al. |
| 9,619,907 | B2 | 4/2017 | Sakai et al. |
| 10,147,209 | B2 | 12/2018 | Sakai et al. |
| 10,295,466 | B2 | 5/2019 | Kato et al. |
| 10,656,090 | B2 | 5/2020 | Kato et al. |
| 10,908,075 | B2 | 2/2021 | Kakuta et al. |
| 11,074,727 | B2 | 7/2021 | Sakai et al. |
| 11,262,305 | B2 | 3/2022 | Kato et al. |
| 11,340,167 | B2 | 5/2022 | Kato et al. |
| 11,480,513 | B2 | 10/2022 | Umetsu |
| 2012/0056103 | A1* | 3/2012 | Sakai ............. G01N 21/64 250/459.1 |
| 2013/0346023 | A1 | 12/2013 | Novo et al. |
| 2016/0033387 | A1 | 2/2016 | Malachowski et al. |
| 2017/0038299 | A1 | 2/2017 | Long et al. |
| 2021/0123859 | A1 | 4/2021 | Kakuta et al. |

FOREIGN PATENT DOCUMENTS

| | | |
|---|---|---|
| EP | 3680645 A1 | 7/2020 |
| JP | 2003083894 | 3/2003 |
| JP | 4523673 | 8/2010 |
| JP | 2012052985 A | 3/2012 |
| WO | WO200709717 A1 | 1/2007 |
| WO | WO2007097171 A1 | 8/2007 |

OTHER PUBLICATIONS

Dinant, et al. "Fluorescence resonance energy transfer of GFP and YFP by spectral imaging and quantitative acceptor photobleaching", Journal of Microscopy, vol. 231, Pt 1 2008, pp. 97-104.
Ducros, et al. "Spectral Unmixing: Analysis of Performance in the Olfactory Bulb In Vivo", PLoS One, 2009 I vol. 4, Issue 2 , 10 pages.
Haraguchi, et al. "Spectral imaging fluorescence microscopy", Blackwell Science Limited Genes to Cells (2002), 7, pp. 881-887.
Hiroka, et al. "Multispectral imaging fluorescence microscopy for living cells", Cell & Developmental Biology, vol. 27, Issue No. 5, 2002, 8 Pages.
Mallick, et al. "Comparison of Raman Spectra Estimation Algorithms", 12th International Conference on Information Fusion, 2009, 9 Pages.
Misra, et al. "Comment on Analyzing Flow Cytometric Data for Comparison of Mean Values of the Coefficient of Variation of the G1 Peak", Cytometry 36: pp. 112-116 (1999).
Novo, et al. "Generalized Unmixing Model for Multispectral Flow Cytometry Utilizing Nonsquare Compensation Matrices", Cytometry Part A, 83A, pp. 508-520, 2013.
Palkki, et al. "Chemical mixture estimation under a Poisson Raman spectroscopy model", Optical Engineering 49 (11), 113601 (2010), 11 pages.
Palkki, "Chemical Identification Under a Poisson Model for Raman Spectroscopy" Georgia Institute of Technology, 2011, 140 Pages.
Reichardt, et al., "Analysis of Flow-Cytometer Scattering and Fluorescence Data to Identify Particle Mixtures", Sandia National Laboratories, 2008, 19 pages.
Robinson, et al. "Multispectral cytometry of single bio-particles using a 32-channel detector", Advanced Biomedical and Clinical Diagnostic Systems III, vol. 5692, 2005, 7 pages.
Tsurui, et al. "Seven-color Fluorescence Imaging of Tissue Samples Based on Fourier Spectroscopy and Singular Value Decomposition", The Journal of Histochemistry & Cytochemistry, vol. 48(5): 653-662, 2000.
Zimmermann, et al. "Spectral Imaging and Linear Unmixing in Light Microscopy", Adv Biochem Engin/Biotechnol (2005) 95: 245-265.
Zacharakis, et al. "Spectroscopic detection improves multi-color quantification in fluorescence tomography", Biomedical Optics Express, 2011, vol. 2, No. 3, 9 Pages.
Zimmermann, et al. "Spectral imaging and its applications in live cell microscopy", FEBS Letters, 546,(2003), pp. 87-92.
Novo, et al. :"Generalized Unmixing Model for Multispectral Flow Cytometry Utilizing Nonsquare Compensation Matrices", Cytometry Part A 83A: 508520, 2013, 13 pages.
Futamura, et al. "Novel Full-Spectral Flow Cytometry with Multiple Spectrally-Adjacent Fluorescent Proteins and Fluorochromes and Visualization of In Vivo Cellular Movement", Cytometry Part A 87A: 830842, 2015, 13 pages.
Herzenberg, et al. "The History and Future of the Fluorescence Activated Cell Sorter and Flow Cytometry: A View from Stanford", Clinical Chemistry 48:10, 1819-1827 (2002).
Palkki, et al. "Algorithms and Performance Bounds for Chemical Identification under a Poisson Model for Raman Spectroscopy", 12th International Conference on Information Fusion Seattle, WA, USA, Jul. 6-9, 2009.
Perfetto, et al. "Seventeen-colour flow cytometry: unravelling the immune system", Nature Reviews (2004) vol. 4: 648-655.
Roederer, et al. "8 Color, 10-Parameter Flow Cytometry to Elucidate Complex Leukocyte Heterogeneity", Cytometry 29:328-339 (1997).
Shapiro, et al. Practical Flow Cytometry Shapiro, 4th Edition, 2003, pp. 225-256.
Hiraoka, et al. "Multispectral imaging fluorescence microscopy for living cells", Cell Structure and Function, Oct. 2002;27(5):367-74.
Novo, et al. "Generalized unmixing model for multispectral flow cytometry utilizing nonsquare compensation matrices", Cytometry A . May 2013;83(5):508-20.

* cited by examiner

METHODS FOR SPECTRALLY RESOLVING FLUOROPHORES OF A SAMPLE AND SYSTEMS FOR SAME

CROSS-REFERENCE TO RELATED APPLICATION

This application is related to U.S. Provisional Patent Application Ser. No. 62/786,186 filed Dec. 28, 2018; U.S. Provisional Patent Application Ser. No. 62/803,975 filed Feb. 11, 2019 and U.S. Provisional Patent Application Ser. No. 62/924,999 filed Oct. 23, 2019; the disclosures of which applications are herein incorporated by reference.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

To sort particles in the sample, a drop charging mechanism charges droplets of the flow stream containing a particle type to be sorted with an electrical charge at the break-off point of the flow stream. Droplets are passed through an electrostatic field and are deflected based on polarity and magnitude of charge on the droplet into one or more collection containers. Uncharged droplets are not deflected by the electrostatic field.

SUMMARY

Aspects of the present disclosure include methods for spectrally resolving light from fluorophores having overlapping fluorescence spectra in a sample. Methods according to certain embodiments include detecting light with a light detection system from a sample having a plurality of fluorophores having overlapping fluorescence spectra and spectrally resolving light from each fluorophore in the sample. In some embodiments, methods include estimating the abundance of one or more of the fluorophores in the sample, such as on a particle. In certain instances, methods include identifying the particle in the sample based on the abundance of each fluorophore and sorting the particle. Methods according to some embodiments include spectrally resolving the light from each fluorophore by calculating a spectral unmixing matrix for the fluorescence spectra of each fluorophore. Systems and integrated circuit devices (e.g., a field programmable gate array) for practicing the subject methods are also provided.

In some embodiments, samples of interest include a plurality of fluorophores where the fluorescence spectra of each fluorophore overlaps with the fluorescence spectra of at least one other fluorophore in the sample. In certain instances, the fluorescence spectra of each fluorophore overlaps with the fluorescence spectra of at least one other fluorophore in the sample by 10 nm or more, such as 25 nm or more and including by 50 nm or more. In some instances, the fluorescence spectra of one or more fluorophores in the sample overlaps with the fluorescence spectra of two different fluorophores in the sample, such as by 10 nm or more, such as by 25 nm or more and including by 50 nm or more. In other embodiments, samples of interest include a plurality of fluorophores having non-overlapping fluorescence spectra. In these embodiments, the fluorescence spectra of each fluorophore is adjacent to at least one other fluorophore within 10 nm or less, such as 9 nm or less, such as 8 nm or less, such as 7 nm or less, such as 6 nm or less, such as 5 nm or less, such as 4 nm or less, such as 3 nm or less, such as 2 nm or less and including 1 nm or less.

In some embodiments, methods include spectrally resolving light from each fluorophore by calculating a spectral unmixing matrix for the fluorescence spectra of each fluorophore in the sample. In some instances, calculating the spectral unmixing matrix includes using a weighted least square algorithm. In some instances, the weighted least squares algorithm is calculated according to:

$$\hat{a} = (X^T W X)^{-1} X^T W y$$

where y is measured detector values from the plurality of photodetectors of a light detection system for each particle (e.g., cell); $\hat{a}$ is estimated fluorophore abundance; X is spillover; and W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}.$$

In some embodiments, each $W_{ii}$ is calculated according to:

$$W_{ii} = \frac{1}{\sigma_i^2} \approx \frac{1}{y_i + \lambda_i}$$

where $\sigma_i^2$ is variance at detector i; $y_i$ is signal at detector i; and $\lambda_i$ is constant noise at detector i. In certain embodiments, the spectral unmixing matrix is calculated according to: $(X^T W X)^{-1} X^T W$. In some instances, $(X^T W X)$ is inverted for each particle detected by the light detection system to calculate a spectral unmixing matrix.

In certain embodiments, methods for spectrally resolving light from each fluorophore include approximating the inversion of $(X^T W X)$ in the weighted least square algorithm for each particle detected by the light detection system, such as for example in order to sort particles in the sample in real time. In some embodiments, inverting $(X^T W X)$ includes approximating $(X^T W X)^{-1}$ using an iterative Newton-Raphson calculation according to:

$$A^{-1} = (X^T W X)^{-1};$$

$$A_0^{-1} = (X^T W_G X)^{-1}$$

$$A_{i+1}^{-1} = (2I - A_i^{-1} A) A_i^{-1}$$

where $W_G$ is a predetermined approximation of W that is determined from baseline variance of each photodetector (i.e., in the absence of fluorescence due to a particle) in the light detection system. In some embodiments, methods further include estimating the baseline variance of each photodetector. In some instances, methods include determining the photodetector noise components (e.g., electronic noise, background light, etc.) using a single stain control sample. In certain instances, methods include determining the variance of each photodetector before irradiating the sample with the light source. In other instances, methods include determining the predetermined approximation of W, $W_G$, before irradiating the sample with the light source. In certain embodiments, methods include precomputing $A_0^{-1}$ with the predetermined $W_G$. In these embodiments, the precomputed $A_0^{-1}$ can be used as a first approximation of the $A^{-1}$ for each particle detected by the light detection system.

In other embodiments, methods for spectrally resolving light from each fluorophore include using a Sherman-Morrison iterative inverse updater. In some instances, methods include computing A using the Sherman-Morrison formula:

$$(A_0 + uv^T)^{-1} = A_0^{-1} - \frac{A_0^{-1} uv^T A_0^{-1}}{1 + v^T A_0^{-1} u}$$

In certain instances, methods include precomputing $A_0^{-1}$ to compute the inverse of a perturbation of $A_0$ using the Sherman-Morrison formula. In some embodiments, the inverse of $A_0$ is calculated by the formula $X^T W_0 X$ and the inverse of A is calculated by the formula $X^T W X$. In some instances, methods include calculating $\Delta A$ (i.e., $A - A_0$) as a product of column vectors with each iterative W according to:

$$W_0 = \begin{bmatrix} w_{11}^0 & 0 & \cdots & 0 \\ 0 & w_{22}^0 & \cdots & 0 \\ \vdots & \vdots & \ddots & \vdots \\ 0 & 0 & \cdots & w_{N_D N_D}^0 \end{bmatrix} \text{ and } W = \begin{bmatrix} w_{11} & 0 & \cdots & 0 \\ 0 & w_{22} & \cdots & 0 \\ \vdots & \vdots & \ddots & \vdots \\ 0 & 0 & \cdots & w_{N_D N_D} \end{bmatrix}$$

where $w_{ii} = w_{ii}^0 + \alpha_i$ for $i \in [1, N_D]$.

$$W_1 = W_0 + \begin{bmatrix} \alpha_i & 0 & \cdots & 0 \\ 0 & 0 & \cdots & 0 \\ \vdots & \vdots & \ddots & \vdots \\ 0 & 0 & \cdots & 0 \end{bmatrix}, W_2 = W_1 + \begin{bmatrix} 0 & 0 & \cdots & 0 \\ 0 & \alpha_2 & \cdots & 0 \\ \vdots & \vdots & \ddots & \vdots \\ 0 & 0 & \cdots & 0 \end{bmatrix} \text{ and}$$

$$W = W_{N_D} = W_{N_D - 1} + \begin{bmatrix} 0 & 0 & \cdots & 0 \\ 0 & 0 & \cdots & 0 \\ \vdots & \vdots & \ddots & \vdots \\ 0 & 0 & \cdots & \alpha_{N_D} \end{bmatrix} \text{ and}$$

$$\Delta W_i = W_i - W = \begin{bmatrix} 0 & 0 & 0 & \cdots & 0 \\ \vdots & \ddots & \vdots & & 0 \\ 0 & \cdots & \alpha_i & \cdots & 0 \\ \vdots & \vdots & \vdots & \ddots & 0 \\ 0 & 0 & 0 & \cdots & 0 \end{bmatrix}$$

According to embodiments, $\Delta A_i = X^T \Delta W_i X = a_i m_i m_i^T$ where A can be expressed as:

$$A = A_0 + \sum_{i=1}^{N_D} \Delta A_i \tag{1}$$

$$= A_0 + \sum_{i=1}^{N_D} \alpha_i m_i m_i^T \tag{2}$$

In these embodiments, each A can be recomputed from $A_0$ with each new weight matrix W (i.e., with different values from $W_0$) using the change to each $w_i$. In some embodiments, methods include performing a Sherman-Morrison iterative inverse updater for approximating the spectral unmixing matrix according to:

$$A^{-1} = \left( A_0 + \sum_{i=1}^{N_D} \Delta A_i \right)^{-1} \tag{3}$$

$$= \left( A_0 + \Delta A_1 + \sum_{i=2}^{N_D} \Delta A_i \right)^{-1} \tag{4}$$

$$= \left( A_1 + \sum_{i=2}^{N_D} \Delta A_i \right)^{-1}, \text{ etc...} \tag{5}$$

$$A_i^{-1} = (A_{i-1} + \alpha_i m_i m_i^T)^T \tag{6}$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \tag{7}$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \tag{8}$$

In some embodiments, a precomputed value for $A_0^{-1}$ is used to calculate $A_1^{-1}$. The precomputed $A_1^{-1}$ is then used to calculate $A_2^{-1}$. The value $A^{-1}$ can be calculated by repeat computing of $A_i^{-1}$ using each $(A_{i-1})^{-1}$ from i=1 to $N_D$.

In some embodiments, methods for spectrally resolving light from each fluorophore include calculating a weighted least squares algorithm by matrix decomposition (i.e., factorization). In some instances, methods include LU matrix decomposition, such as where a matrix is decomposed into a product of a lower-triangular (L) matrix and an upper-triangular (U) matrix. In certain instances, LU decomposition includes Gaussian elimination. In other instances, LU decomposition includes a modified Cholesky decomposition, an LDL decomposition where D is diagonal matrix. In certain embodiments, the weighted least squares algorithm (a) is calculated using a modified Cholesky decomposition according to:

$$X^T W X a = X^T W y$$

$Aa = B$ $LDL^T a = B$      LDL decomposition $Lz = B$ where $z = DL^T a$    Lower–triangular matrix solution $Dx = z$ where $x = L^T a$    Diagonal matrix solution $L^T a = x$      Upper–triangular matrix solution In other embodiments, methods for spectrally resolving light from each fluorophore include calculating a weighted least squares algorithm by QR factorization. In some instances, the QR factorization is a matrix that is the product of an orthogonal (Q) matrix and an upper-triangular (R) matrix. In some embodiments, the weighted least squares algorithm (a) is calculated using QR factorization according to:

$$X^T W X a = X^T W y$$
$$\bar{X}^T \bar{X} a = \bar{X}^T \bar{y} \text{ where } QR = \bar{X}(QR)^T QRa = (QR)^T \bar{y}$$
$$R^T Q^T QRa = R^T Q^T \bar{y}$$
$$R^T R a = R^T Q^T \bar{y}$$
$$Ra = Q^T \bar{y}$$

In yet other embodiments, methods for spectrally resolving light from each fluorophore include calculating a weighted least squares algorithm by singular value decomposition (SVD). In some instances, the singular value decomposition is the matrix that is the product $\bar{X}=U\Sigma V^T$ where U and V are orthogonal matrices and $\Sigma$ is a diagonal matrix containing singular values of $\bar{X}$. In certain instances, the weighted least squares algorithm (a) is calculated using singular value decomposition according to:

$$z = U^T y$$
$$\sum w = z$$
$$a = Vw$$

In some embodiments, the abundance of one or more of fluorophores in the sample (e.g., on a particle) is determined by spectrally resolving the light from each fluorophore. In some embodiments, spectrally resolving light from each fluorophore in the sample includes calculating a spectral unmixing matrix for the fluorescence spectra of each fluorophore (e.g., on a target particle). In some instances, methods include estimating the abundance of one or more fluorophores on a particle and identifying the particle in the sample based on the estimated abundance of each fluorophore. In certain instances, identified particles (e.g., cells in a biological sample) in the sample are sorted.

Systems for practicing the subject methods are also provided. Systems according to certain embodiments include a light source configured to irradiate a sample having a plurality of fluorophores that have overlapping fluorescence spectra; a light detection system comprising a plurality of photodetectors; and a processor with memory operably coupled to the processor where the memory includes instructions stored thereon, which when executed by the processor, cause the processor to spectrally resolve light from each fluorophore in the sample. In some embodiments, the processor includes memory with instructions which when executed by the processor, cause the processor to spectrally resolve fluorescence from each fluorophore by calculating a spectral unmixing matrix for the fluorescence spectra of each fluorophore in the sample. In some instances, the weighted least squares algorithm is calculated according to:

$$\hat{a} = (X^T W X)^{-1} X^T W y$$

where y is measured detector values from the plurality of photodetectors of the light detection system for each particle; â is estimated fluorophore abundance X is spillover; and W is $$\begin{bmatrix} W_{ii} & 0 & \ldots & 0 \\ 0 & W_{i+1, i+1} & \ldots & 0 \\ \vdots & \vdots & \ddots & \vdots \\ 0 & 0 & \ldots & W_{i+n, i+n} \end{bmatrix}.$$

In some embodiments, each $W_{ii}$ is calculated according to:

$$W_{ii} = \frac{1}{\sigma_i^2} \approx \frac{1}{y_i + \lambda_i}$$

where $\sigma_i^2$ is variance at detector i; $y_i$ is signal at detector i; and $\lambda_i$ is constant noise at detector i. In certain embodiments, the spectral unmixing matrix is calculated according to: $(X^T W X)^{-1} X^T W$. In some instances, $(X^T W X)$ is inverted for each particle detected by the light detection system to calculate a spectral unmixing matrix.

In certain embodiments, systems include a processor with memory operably coupled to the processor where the memory includes instructions stored thereon, which when executed by the processor, cause the processor to approximate the inversion of $(X^T W X)$ in the weighted least square algorithm for each particle detected by the light detection system in order to sort particles in the sample in real time. In certain instances, the inversion of $(X^T W X)$ is approximated using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

where $W_G$ is a predetermined approximation of W that is determined from variance of each photodetector in the light detection system. The variance, in some embodiments, has a photodetector noise component. For example, the photodetector noise component may include one or more of electronic noise and optical background light. In some embodiments, the variance of the photodetector is proportional to measured intensity of light by the photodetector. In some embodiments, the photodetector noise component is estimated using a single stain control sample. In certain embodiments, the memory includes instructions stored thereon, which when executed by the processor, cause the processor to automatically determine the variance of each photodetector before irradiating the sample with the light source. In other embodiments, the memory includes instructions stored thereon, which when executed by the processor, cause the processor to automatically predetermine $W_G$ before irradiating the sample with the light source. In certain embodiments, the memory includes instructions stored thereon, which when executed by the processor, cause the processor to precompute $A_0^{-1}$ with the predetermined $W_G$. In these embodiments, the precomputed $A_0^{-1}$ may be stored in memory and used by the processor as a first approximation of the $A^{-1}$ for each particle detected by the light detection system.

In other embodiments, systems include a processor with memory operably coupled to the processor where the memory includes instructions stored thereon, which when executed by the processor, cause the processor to approximate the weighted least square algorithm for each particle with a Sherman-Morrison iterative inverse updater. In some instances, the memory includes instructions for computing A using the Sherman-Morrison formula:

$$(A_0 + uv^T)^{-1} = A_0^{-1} - \frac{A_0^{-1} uv^T A_0^{-1}}{1 + v^T A_0^{-1} u}$$

In certain instances, the memory includes instructions for precomputing $A_0^{-1}$ to compute the inverse of a perturbation of $A_0$ using the Sherman-Morrison formula. In some embodiments, the inverse of $A_0$ is calculated by the formula $X^T W_0 X$ and the inverse of A is calculated by the formula $X^T W X$. In some instances, the memory includes instructions for calculating $\Delta A$ (i.e., $A-A_0$) as a product of column vectors with each iterative W according to:

$$W_0 = \begin{bmatrix} w_{11}^0 & 0 & \cdots & 0 \\ 0 & w_{22}^0 & \cdots & 0 \\ \vdots & \vdots & \ddots & \vdots \\ 0 & 0 & \cdots & w_{N_D N_D}^0 \end{bmatrix} \text{ and } W = \begin{bmatrix} w_{11} & 0 & \cdots & 0 \\ 0 & w_{22} & \cdots & 0 \\ \vdots & \vdots & \ddots & \vdots \\ 0 & 0 & \cdots & w_{N_D N_D} \end{bmatrix}$$

where $w_{ii} = w_{ii}^0 + \alpha_i$ for $i \in [1, N_D]$. $W_1 = W_0 + \begin{bmatrix} \alpha_1 & 0 & \cdots & 0 \\ 0 & 0 & \cdots & 0 \\ \vdots & \vdots & \ddots & \vdots \\ 0 & 0 & \cdots & 0 \end{bmatrix}$, $$W_2 = W_1 + \begin{bmatrix} 0 & 0 & \cdots & 0 \\ 0 & \alpha_2 & \cdots & 0 \\ \vdots & \vdots & \ddots & \vdots \\ 0 & 0 & \cdots & 0 \end{bmatrix} \text{ and } W = W_{N_D} = W_{N_D-1} +$$

$$\begin{bmatrix} 0 & 0 & \cdots & 0 \\ 0 & 0 & \cdots & 0 \\ \vdots & \vdots & \ddots & \vdots \\ 0 & 0 & \cdots & \alpha_{N_D} \end{bmatrix} \text{ and }$$

$$\Delta W_i = W_i - W = \begin{bmatrix} 0 & 0 & 0 & \cdots & 0 \\ \vdots & \ddots & \vdots & \vdots & 0 \\ 0 & \cdots & \alpha_i & \cdots & 0 \\ \vdots & \vdots & \vdots & \ddots & 0 \\ 0 & 0 & 0 & \cdots & 0 \end{bmatrix}$$

According to embodiments, $\Delta A = X^T \Delta W_i X = a_i m_i m_i^T$ where A can be expressed as:

$$A = A_0 + \sum_{i=1}^{N_D} \Delta A_i \tag{1}$$

$$= A_0 + \sum_{i=1}^{N_D} \alpha_i m_i m_i^T \tag{2}$$

In these embodiments, each A can be recomputed from $A_0$ with each new weight matrix W (i.e., with different values from $W_0$) using the change to each $w_i$. In some embodiments, systems include a processor with memory operably coupled to the processor where the memory includes instructions stored thereon, which when executed by the processor, cause the processor to perform a Sherman-Morrison iterative inverse updater for approximating the spectral unmixing matrix according to:

$$A^{-1} = \left( A_0 + \sum_{i=1}^{N_D} \Delta A_i \right)^{-1} \tag{3}$$

$$= \left( A_0 + \Delta A_1 + \sum_{i=2}^{N_D} \Delta A_i \right)^{-1} \tag{4}$$

$$= \left( A_1 + \sum_{i=2}^{N_D} \Delta A_i \right)^{-1}, \text{ etc...} \tag{5}$$

$$A_i^{-1} = (A_{i-1} + \alpha_i m_i m_i^T)^{-1} \tag{6}$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \tag{7}$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \tag{8}$$

In some embodiments, a precomputed value for $A_0^{-1}$ is used to calculate $A_1^{-1}$. The precomputed $A_1^{-1}$ is then used to calculate $A_2^{-1}$. The value $A^{-1}$ can be calculated by repeat computing of $A_i^{-1}$ using each $(A_{i-1})^{-1}$ from i=1 to $N_D$.

In other embodiments, systems include a processor with memory operably coupled to the processor where the memory includes instructions stored thereon, which when executed by the processor, cause the processor to calculate the weighted least square algorithm for each particle by matrix decomposition. In some instances, the memory includes instructions for a LU matrix decomposition, such as where a matrix is decomposed into a product of a lower-triangular (L) matrix and an upper-triangular (U) matrix. In certain instances, LU decomposition includes Gaussian elimination. In other instances, LU decomposition includes a modified Cholesky decomposition, an LDL decomposition where D is diagonal matrix. In certain embodiments, systems include a processor with memory operably coupled to the processor where the memory includes instructions stored thereon, which when executed by the processor, cause the processor to calculate the weighted least squares algorithm (a) using a modified Cholesky decomposition according to:

$$X^T W X a = X^T W y$$

| | |
|---|---|
| $Aa = B$ | |
| $LDL^T a = B$ | LDL decomposition |
| $Lz = B$ where $z = DL^T a$ | Lower– matrix solution triangular |
| $Dx = z$ where $x = L^T a$ | Diagonal matrix solution |
| $L^T a = x$ | Upper– matrix solution triangular |

In other embodiments, systems include a processor with memory operably coupled to the processor where the memory includes instructions stored thereon, which when executed by the processor, cause the processor to calculate a weighted least squares algorithm by QR factorization. In some instances, the QR factorization is a matrix that is the product of an orthogonal (Q) matrix and an upper-triangular (R) matrix. In some embodiments, the memory includes instructions for calculating the weighted least squares algorithm (a) using QR factorization according to:

$$X^T W X a = X^T W y$$
$$\overline{X}^T \overline{X} a = \overline{X}^T \overline{y} \text{ where } QR = \overline{X} (QR)^T QRa = (QR)^T \overline{y}$$
$$R^T Q^T QRa = R^T Q^T \overline{y}$$
$$R^T Ra = R^T Q^T \overline{y}$$
$$Ra = Q^T \overline{y}$$

In yet other embodiments, systems include a processor with memory operably coupled to the processor where the memory includes instructions stored thereon, which when executed by the processor, cause the processor to calculate a weighted least squares algorithm by singular value decomposition (SVD). In some instances, the singular value decomposition is the matrix that is the product $\overline{X} = U\Sigma V^T$ where U and V are orthogonal matrices and $\Sigma$ is a diagonal matrix containing singular values of $\overline{X}$. In certain instances, the memory includes instructions for calculating the weighted least squares algorithm (a) using singular value decomposition according to:

$$z = U^T y$$
$$\Sigma w = z$$
$$a = Vw$$

In some embodiments, systems include a processor with memory operably coupled to the processor where the memory includes instructions stored thereon, which when executed by the processor, cause the processor to estimate an abundance of one or more of the fluorophores in the sample based the calculated spectral unmixing matrix. In certain instances, the memory includes instructions for estimating the abundance of one or more fluorophores on a particle in the sample. In some embodiments the memory includes instructions for identifying a particle in the sample based on the estimated abundance of each fluorophore on the particle. In certain instances, systems include a particle sorter for sorting identified particles in the sample.

Integrated circuit devices programmed to spectrally resolve light from a plurality of fluorophores in a sample are also provided. In embodiments, the integrated circuit device may be a field programmable gated array (FPGA), an application specific integrated circuit (ASIC) or a complex programmable logic device (CPLD), or some other integrated circuit device. In some embodiments, the integrated circuit device is programmed to spectrally resolve fluorescence from each fluorophore by calculating a spectral unmixing matrix for the fluorescence spectra of each fluorophore in the sample. In some instances, the weighted least squares algorithm is calculated according to:

$$\hat{a} = (X^T W X)^{-1} X^T W y$$

where y is measured detector values from the plurality of photodetectors of the light detection system for each particle; â is estimated fluorophore abundance X is spillover; and W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

In some embodiments, each $W_{ii}$ is calculated according to:

$$W_{ii} = \frac{1}{\sigma_i^2} \approx \frac{1}{y_i + \lambda_i}$$

where $\sigma_i^2$ is variance at detector i; $y_i$ is signal at detector i; and $\lambda_i$ is constant noise at detector i. In certain embodiments, the spectral unmixing matrix is calculated according to: $(X^T W X)^{-1} X^T W$. In some instances, $(X^T W X)$ is inverted for each particle detected by the light detection system to calculate a spectral unmixing matrix.

In certain embodiments, integrated circuit devices are programmed to approximate the inversion of $(X^T W X)$ in the weighted least square algorithm for each particle detected by the light detection system in order to sort particles in the sample in real time. In certain instances, the inversion of $(X^T W X)$ is approximated using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

where $W_G$ is a predetermined approximation of W that is determined from variance of each photodetector in the light detection system. In some embodiments, the integrated circuit device is programmed to further estimate the variance of each photodetector. In certain instances, the integrated circuit device is programmed with an estimate of the photodetector noise components based on a single stain control sample. In other instances, the variance of each photodetector is programmed into the integrated circuit device before the sample is irradiated with a light source. In still other instances, the predetermined approximation of W in the iterative Newton-Raphson calculation, $W_G$, is programmed into the integrated circuit device before the sample is irradiated with a light source. In certain embodiments, the integrated circuit device is programmed to precompute $A_0^{-1}$ with the predetermined $W_G$. In these embodiments, the precomputed $A_0^{-1}$ may be programmed into the integrated circuit device and used as a first approximation of the $A^{-1}$ for each particle detected by the light detection system.

In other embodiments, integrated circuit devices of interest are programmed to approximate the weighted least square algorithm for each particle with a Sherman-Morrison iterative inverse updater. In some instances, the integrated circuit device is programmed for computing A using the Sherman-Morrison formula:

$$(A_0 + uv^T)^{-1} = A_0^{-1} - \frac{A_0^{-1} uv^T A_0^{-1}}{1 + v^T A_0^{-1} u}$$

In certain instances, the integrated circuit device is programmed for precomputing $A_0^{-1}$ to compute the inverse of a perturbation of $A_0$ using the Sherman-Morrison formula. In some embodiments, the inverse of $A_0$ is calculated by the formula $X^T W_0 X$ and the inverse of A is calculated by the formula $X^T W X$. In some instances, the integrated circuit device is programmed to calculate $\Delta A$ (i.e., $A - A_0$) as a product of column vectors with each iterative W according to:

$$W_0 = \begin{bmatrix} w_{11}^0 & 0 & \cdots & 0 \\ 0 & w_{22}^0 & \cdots & 0 \\ \vdots & \vdots & \ddots & \vdots \\ 0 & 0 & \cdots & w_{N_D N_D}^0 \end{bmatrix} \text{ and } W = \begin{bmatrix} w_{11} & 0 & \cdots & 0 \\ 0 & w_{22} & \cdots & 0 \\ \vdots & \vdots & \ddots & \vdots \\ 0 & 0 & \cdots & w_{N_D N_D} \end{bmatrix}$$

where $w_{ii} = w_{ii}^0 + \alpha_i$ for $i \in [1, N_D]$. $W_1 = W_0 + \begin{bmatrix} \alpha_1 & 0 & \cdots & 0 \\ 0 & 0 & \cdots & 0 \\ \vdots & \vdots & \ddots & \vdots \\ 0 & 0 & \cdots & 0 \end{bmatrix}$, $W_2 = W_1 + \begin{bmatrix} 0 & 0 & \cdots & 0 \\ 0 & \alpha_2 & \cdots & 0 \\ \vdots & \vdots & \ddots & \vdots \\ 0 & 0 & \cdots & 0 \end{bmatrix}$ and $W = W_{N_D} = W_{N_D-1} + \begin{bmatrix} 0 & 0 & \cdots & 0 \\ 0 & 0 & \cdots & 0 \\ \vdots & \vdots & \ddots & \vdots \\ 0 & 0 & \cdots & \alpha_{N_D} \end{bmatrix}$ and $$\Delta W_i = W_i - W = \begin{bmatrix} 0 & 0 & 0 & \cdots & 0 \\ \vdots & \ddots & \vdots & \vdots & 0 \\ 0 & \cdots & \alpha_i & \cdots & 0 \\ \vdots & \vdots & \vdots & \ddots & 0 \\ 0 & 0 & 0 & \cdots & 0 \end{bmatrix}$$

According to embodiments, $\Delta A_i = X^T \Delta W_i X = a_i m_i m_i^T$ where A can be expressed as:

$$A = A_0 + \sum_{i=1}^{N_D} \Delta A_i \quad (1)$$

$$= A_0 + \sum_{i=1}^{N_D} \alpha_i m_i m_i^T \quad (2)$$

In these embodiments, each A can be recomputed from $A_0$ with each new weight matrix W (i.e., with different values from $W_0$) using the change to each $w_i$. In some embodiments, the integrated circuit device is programmed to perform a Sherman-Morrison iterative inverse updater for approximating the spectral unmixing matrix according to:

$$A^{-1} = \left(A_0 + \sum_{i=1}^{N_D} \Delta A_i\right)^{-1} \quad (3)$$

$$= \left(A_0 + \Delta A_i + \sum_{i=2}^{N_D} \Delta A_i\right)^{-1} \quad (4)$$

$$= \left(A_1 + \sum_{i=2}^{N_D} \Delta A_i\right)^{-1}, \text{ etc...} \quad (5)$$

$$A_i^{-1} = \left(A_{i-1} + \alpha_i m_i m_i^T\right)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

In some embodiments, a precomputed value for $A_0^{-1}$ is used to calculate $A_1^{-1}$. The precomputed $A_1^{-1}$ is then used to calculate $A_2^{-1}$. The value $A^{-1}$ can be calculated by repeat computing of $A_i^{-1}$ using each $(A_{i-1})^{-1}$ from $i=1$ to $N_D$.

In other embodiments, integrated circuit devices of interest are programmed to calculate the weighted least square algorithm for each particle by matrix decomposition. In some instances, the integrated circuit device is programmed for instructions for a LU matrix decomposition, such as where a matrix is decomposed into a product of a lower-triangular (L) matrix and an upper-triangular (U) matrix. In certain instances, LU decomposition includes Gaussian elimination. In other instances, LU decomposition includes a modified Cholesky decomposition, an LDL decomposition where D is diagonal matrix. In certain embodiments, integrated circuit devices are programmed to calculate the weighted least squares algorithm (a) using a modified Cholesky decomposition according to:

$X^T W X a = X^T W y$ $Aa = B$

| | |
|---|---|
| $LDL^T a = B$ | LDL decomposition |
| $Lz = B$ where $z = DL^T a$ | Lower-triangular matrix solution |
| $Dx = z$ where $x = L^T a$ | Diagonal matrix solution |
| $L^T a = x$ | Upper-triangular matrix solution |

In other embodiments, integrated circuit devices are programmed to calculate a weighted least squares algorithm by QR factorization. In some instances, the QR factorization is a matrix that is the product of an orthogonal (Q) matrix and an upper-triangular (R) matrix. In some embodiments, integrated circuit devices are programmed to calculate the weighted least squares algorithm (a) using QR factorization according to:

$X^T W X a = X^T W y$ $\overline{X}^T \overline{X} a = \overline{X}^T \overline{y}$ where $QR = \overline{X}(QR)^T QR a = (QR)^T \overline{y}$ $R^T Q^T QR a = R^T Q^T \overline{y}$ $R^T R a = R^T Q^T \overline{y}$ $Ra = Q^T \overline{y}$ In yet other embodiments, integrated circuit devices are programmed to calculate a weighted least squares algorithm by singular value decomposition (SVD). In some instances, the singular value decomposition is the matrix that is the product $\overline{X} = U\Sigma V^T$ where U and V are orthogonal matrices and $\Sigma$ is a diagonal matrix containing singular values of $\overline{X}$. In certain instances, integrated circuit devices are programmed to calculate the weighted least squares algorithm (a) using singular value decomposition according to:

$$z = U^T y$$

$$\Sigma w = z$$

$$a = Vw$$

In some embodiments, the integrated circuit devices are programmed to estimate an abundance of one or more of the fluorophores in the sample based on the calculated spectral unmixing matrix. In certain instances, the integrated circuit device is programmed to estimate the abundance of one or more fluorophores on a particle in the sample. In some embodiments, the integrated circuit devices are programmed to identify a particle in the sample based on the estimated abundance of each fluorophore on the particle. In certain instances, the integrated circuit devices are programmed to sort the identified particles in the sample.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
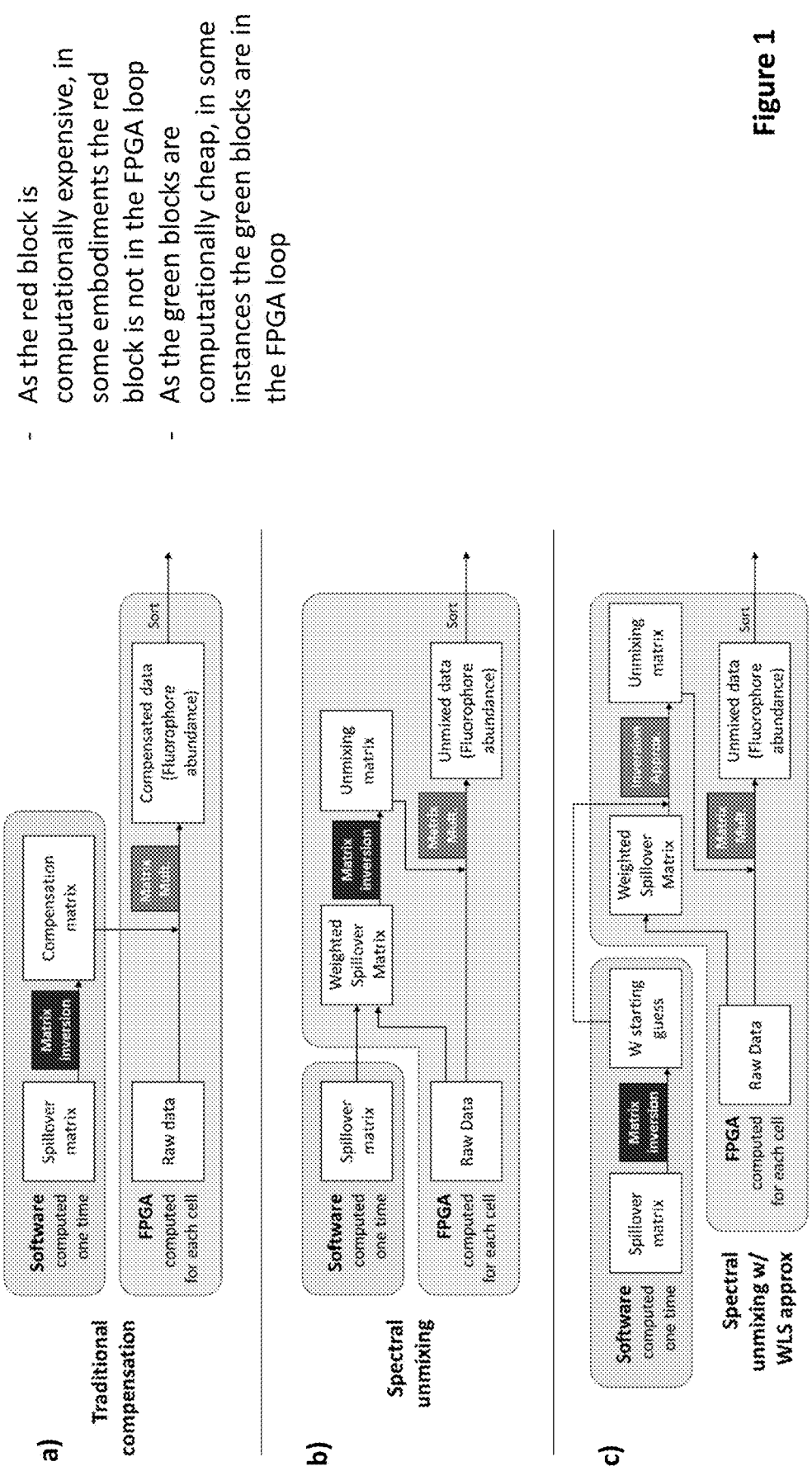
FIG. 1 depicts a comparison of determining fluorophore abundance by a) traditional spectral overlap compensation; b) by spectral unmixing calculated using an ordinary least squares algorithm; and c) by spectral unmixing calculated using a weighted least squares algorithm with a weight factor (W) that is approximated for each cell in real time according to certain embodiments.
Figure 2:
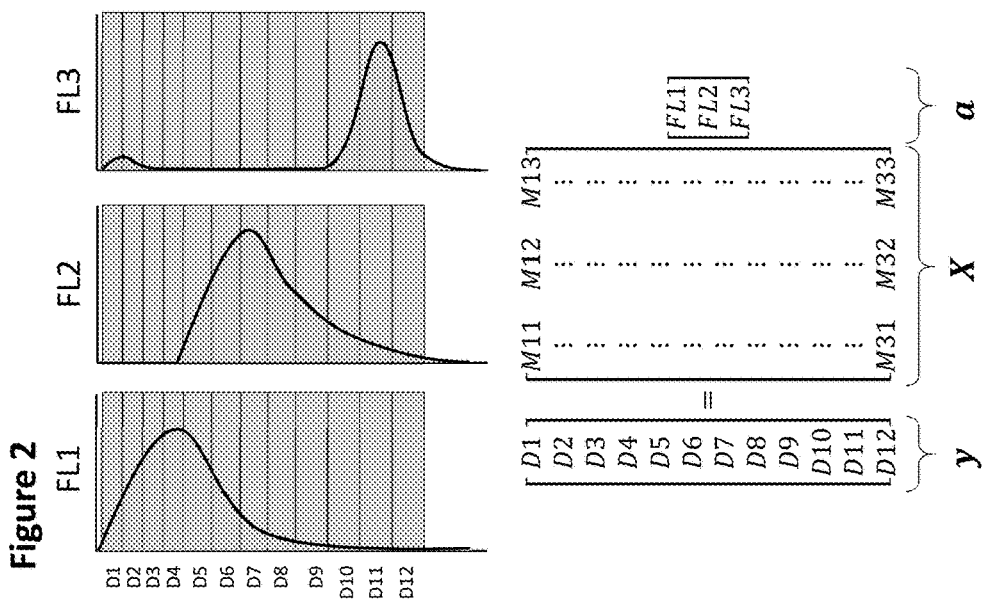
FIG. 2 depicts a comparison of spectral unmixing by a weighted least squares algorithm and approximation of the weight factor (W) to sort cells in real time according to certain embodiments.

Aspects of the present disclosure include methods for spectrally resolving light from fluorophores having overlapping fluorescence spectra in a sample. Methods according to certain embodiments include detecting light with a light detection system from a sample having a plurality of fluorophores having overlapping fluorescence spectra and spectrally resolving light from each fluorophore in the sample. In some embodiments, methods include estimating the abundance of one or more of the fluorophores in the sample, such as on a particle. In certain instances, methods include identifying the particle in the sample based on the abundance of each fluorophore and sorting the particle. Methods according to some embodiments includes spectrally resolving the light from each fluorophore by calculating a spectral unmixing matrix for the fluorescence spectra of each fluorophore. Systems and integrated circuit devices (e.g., a field programmable gate array) for practicing the subject methods are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for spectrally resolving fluorophores in a sample. In further describing embodiments of the disclosure, methods for spectrally resolving fluorophores in a sample, including estimating an abundance of each fluorophore in the sample (e.g., on a particle in the sample) as well as identifying and sorting particles based on the estimated abundance of each fluorophore are first described in greater detail. Next, systems and integrated circuited devices programmed to practice the subject methods, by calculating a spectral unmixing matrix, are described.

Methods for Spectrally Resolving Light from Fluorophores Having Overlapping Fluorescence Spectra in a Sample Aspects of the present disclosure include methods for spectrally resolving light from fluorophores, including light having overlapping fluorescence spectra, in a sample. The term "spectrally resolving" is used herein in its conventional sense to refer to spectrally distinguishing each fluorophore in the sample by assigning or attributing the overlapping wavelengths of light to each contributing fluorophore. In embodiments, the overlapping spectral component of fluorescence that is attributed to each fluorophore is determined by calculating a spectral unmixing matrix (as described in greater detail below). In some embodiments, samples of interest have a plurality of fluorophores where the fluorescence spectra of each fluorophore overlaps with the fluorescence spectra of at least one other fluorophore in the sample. In some instances, the fluorescence spectra of each fluorophore overlaps with the fluorescence spectra of at least one other fluorophore in the sample by 5 nm or more, such as by 10 nm or more, such as by 25 nm or more and including by 50 nm or more. In certain instances, the fluorescence spectra of one or more fluorophores in the sample overlaps with the fluorescence spectra of two or more different fluorophores in the sample, such as where each overlap in fluorescence spectra is by 5 nm or more, such as by 10 nm or more, such as by 25 nm or more and including by 50 nm or more. In other embodiments, samples of interest include a plurality of fluorophores having non-overlapping fluorescence spectra. In these embodiments, the fluorescence spectra of each fluorophore is adjacent to at least one other fluorophore within 10 nm or less, such as 9 nm or less, such as 8 nm or less, such as 7 nm or less, such as 6 nm or less, such as 5 nm or less, such as 4 nm or less, such as 3 nm or less, such as 2 nm or less and including 1 nm or less.

In practicing the subject methods, a sample is irradiated with a light source and light from the sample is detected with a light detection system having a plurality of photodetectors. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, CO$_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers.

Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

As discussed above, in embodiments light from the irradiated sample is conveyed to a light detection system as described in greater detail below and measured by the plurality of photodetectors. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of fluorophores. In some embodiments, methods include measuring collected light across the entire fluorescence spectrum of each fluorophore in the sample.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

In embodiments, methods include spectrally resolving the light from each fluorophore in the sample. In some embodiments, the overlap between each different fluorophore is determined and the contribution of each fluorophore to the overlapping fluorescence is calculated. In some embodiments, spectrally resolving light from each fluorophore includes calculating a spectral unmixing matrix for the fluorescence spectra for each of the plurality of fluorophores having overlapping fluorescence in the sample detected by the light detection system. As described in greater detail below, spectrally resolving the light from each fluorophore and calculating a spectral unmixing matrix for each fluorophore may be used to estimate the abundance of each fluorophore in the sample. In certain embodiments, the abundance of each fluorophore associated with a target particle may be determined. The abundance of each fluorophore associated with a target particle may be used in identifying and classifying a particle. In some instances, identified or classified particles may be used to sort target particles (e.g., cells) in the sample. In certain embodiments, spectrally resolving fluorophores in the sample, such as by calculating spectral unmixing, is conducted so that sorting is sufficiently fast to sort particles in real time after detection by the light detection system.

In some embodiments, spectrally resolving light from each fluorophore having overlapping fluorescence includes calculating the spectral unmixing matrix using a weighted least squares algorithm. In some instances, the weighted least squares algorithm is calculated according to:

$$\hat{a} = (X^T W X)^{-1} X^T W y$$

where y is measured detector values from the plurality of photodetectors of the light detection system for each cell; â is estimated fluorophore abundance X is spillover; and W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}.$$

In some embodiments, each $W_{ii}$ is calculated according to:

$$W_{ii} = \frac{1}{\sigma_i^2} \approx \frac{1}{y_i + \lambda_i}$$

where $\sigma_i^2$ is variance at detector i; $y_i$ is signal at detector i; and $\lambda_i$ is constant noise at detector i. In certain embodiments, the spectral unmixing matrix is calculated according to: $(X^T W X)^{-1} X^T W$. In some instances, the method comprises inverting $(X^T W X)$ for each cell detected by the light detection system to calculate a spectral unmixing matrix.

In certain embodiments, methods include approximating the inversion of $(X^T W X)$ in the weighted least square algorithm for each cell detected by the light detection system. In some embodiments, inverting $(X^T W X)$ includes approximating $(X^T W X)$ using an iterative Newton-Raphson calculation according to:

$$A^{-1} = (X^T W X)^{-1};$$

$$A_0^{-1} = (X^T W_G X)^{-1}$$

$$A_{i+1}^{-1} = (2I - A_i^{-1} A) A_i^{-1}$$

where $W_G$ is a predetermined approximation of W that is determined from variance of each photodetector in the light detection system. In some embodiments, methods further include estimating the variance of each photodetector. In some instances, methods include determining the photodetector noise components (e.g., electronic noise, background light, etc.) using a single stain control sample. In certain instances, methods include determining the variance of each photodetector before irradiating the sample with the light source. In other instances, methods include determining the predetermined approximation of W, $W_G$, before irradiating the sample with the light source. In certain embodiments, methods include precomputing $A_0^{-1}$ with the predetermined $W_G$. In these embodiments, the precomputed $A_0^{-1}$ can be used as a first approximation of the $A^{-1}$ for each particle detected by the light detection system.

In other embodiments, methods for spectrally resolving light from each fluorophore include using a Sherman-Morrison iterative inverse updater. In some instances, methods include computing A using the Sherman-Morrison formula:

$$(A_0 + uv^T)^{-1} = A_0^{-1} - \frac{A_0^{-1} uv^T A_0^{-1}}{1 + v^T A_0^{-1} u}$$

In certain instances, methods include precomputing $A_0^{-1}$ to compute the inverse of a perturbation of $A_0$ using the Sherman-Morrison formula. In some embodiments, the inverse of $A_0$ is calculated by the formula $X^T W_0 X$ and the inverse of A is calculated by the formula $X^T W X$. In some instances, methods include calculating $\Delta A$ (i.e., $A-A_0$) as a product of column vectors with each iterative W according to:

$$W_0 = \begin{bmatrix} w_{11}^0 & 0 & \cdots & 0 \\ 0 & w_{22}^0 & \cdots & 0 \\ \vdots & \vdots & \ddots & \vdots \\ 0 & 0 & \cdots & w_{N_D N_D}^0 \end{bmatrix} \text{ and } W = \begin{bmatrix} w_{11} & 0 & \cdots & 0 \\ 0 & w_{22} & \cdots & 0 \\ \vdots & \vdots & \ddots & \vdots \\ 0 & 0 & \cdots & w_{N_D N_D} \end{bmatrix}$$

where $w_{ii} = w_{ii}^0 + \alpha_i$ for $i \in [1, N_D]$. $W_1 = W_0 + \begin{bmatrix} \alpha_1 & 0 & \cdots & 0 \\ 0 & 0 & \cdots & 0 \\ \vdots & \vdots & \ddots & \vdots \\ 0 & 0 & \cdots & 0 \end{bmatrix}$, $$W_2 = W_1 + \begin{bmatrix} 0 & 0 & \cdots & 0 \\ 0 & \alpha_2 & \cdots & 0 \\ \vdots & \vdots & \ddots & \vdots \\ 0 & 0 & \cdots & 0 \end{bmatrix} \text{ and}$$

$$W = W_{N_D} = W_{N_D - 1} + \begin{bmatrix} 0 & 0 & \cdots & 0 \\ 0 & 0 & \cdots & 0 \\ \vdots & \vdots & \ddots & \vdots \\ 0 & 0 & \cdots & \alpha_{N_D} \end{bmatrix} \text{ and}$$

$$\Delta W_i = W_i - W = \begin{bmatrix} 0 & 0 & 0 & \cdots & 0 \\ \vdots & \ddots & \vdots & \vdots & 0 \\ 0 & \cdots & \alpha_i & \cdots & 0 \\ \vdots & \vdots & \vdots & \ddots & 0 \\ 0 & 0 & 0 & \cdots & 0 \end{bmatrix}$$

According to embodiments, $\Delta A_i = X^T \Delta W_i X = a_i m_i m_i^T$ where A can be expressed as:

$$A = A_0 + \sum_{i=1}^{N_D} \Delta A_i \quad (1)$$

$$= A_0 + \sum_{i=1}^{N_D} \alpha_i m_i m_i^T \quad (2)$$

In these embodiments, each A can be recomputed from $A_0$ with each new weight matrix W (i.e., with different values from $W_0$) using the change to each $w_i$. In some embodiments, methods include performing a Sherman-Morrison iterative inverse updater for approximating the spectral unmixing matrix according to:

$$A^{-1} = \left( A_0 + \sum_{i=1}^{N_D} \Delta A_i \right)^{-1} \quad (3)$$

$$= \left( A_0 + \Delta A_1 + \sum_{i=2}^{N_D} \Delta A_i \right)^{-1} \quad (4)$$

$$= \left( A_1 + \sum_{i=2}^{N_D} \Delta A_i \right)^{-1}, \text{ etc...} \quad (5)$$

$$A_i^{-1} = \left( A_{i-1} + \alpha_i m_i m_i^T \right)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_1}{1 + \alpha_i m_i^T A_{i-1}^{-1} m_i} A_{i-1}^{-1} m_i m_i^T A_{i-1}^{-1} \quad (8)$$

In some embodiments, a precomputed value for $A_0^{-1}$ is used to calculate $A_1^{-1}$. The precomputed $A_1^{-1}$ is then used to calculate $A_2^{-1}$. The value $A^{-1}$ can be calculated by repeat computing of $A_i^{-1}$ using each $(A_{i-1})^{-1}$ from $i=1$ to $N_D$.

In some embodiments, methods for spectrally resolving light from each fluorophore include calculating a weighted least squares algorithm by matrix decomposition (i.e., factorization). In some instances, methods include LU matrix decomposition, such as where a matrix is decomposed into a product of a lower-triangular (L) matrix and an upper-triangular (U) matrix. In certain instances, LU decomposition includes Gaussian elimination. In other instances, LU decomposition includes a modified Cholesky decomposition, an LDL decomposition where D is diagonal matrix. In certain embodiments, the weighted least squares algorithm (a) is calculated using a modified Cholesky decomposition according to:

$$X^T W X a = X^T W y$$

$Aa = B$
$LDL^T a = B$     LDL decomposition
$Lz = B$ where $z = DL^T a$     Lower-triangular matrix solution
$Dx = z$ where $x = L^T a$     Diagonal matrix solution
$L^T a = x$     Upper-triangular matrix solution In other embodiments, methods for spectrally resolving light from each fluorophore include calculating a weighted least squares algorithm by QR factorization. In some instances, the QR factorization is a matrix that is the product of an orthogonal (Q) matrix and an upper-triangular (R) matrix. In some embodiments, the weighted least squares algorithm (a) is calculated using QR factorization according to:

$$X^T W X a = X^T W y$$
$$\overline{X}^T \overline{X} a = \overline{X}^T \overline{y} \text{ where } QR = \overline{X} (QR)^T QRa = (QR)^T \overline{y}$$
$$R^T Q^T QRa = R^T Q^T \overline{y}$$
$$R^T Ra = R^T Q^T \overline{y}$$
$$Ra = Q^T \overline{y}$$

In yet other embodiments, methods for spectrally resolving light from each fluorophore include calculating a weighted least squares algorithm by singular value decomposition (SVD). In some instances, the singular value decomposition is the matrix that is the product $\overline{X} = U \Sigma V^T$ where U and V are orthogonal matrices and $\Sigma$ is a diagonal matrix containing singular values of $\overline{X}$. In certain instances, the weighted least squares algorithm (a) is calculated using singular value decomposition according to:

$$z = U^T y$$
$$\Sigma w = z$$
$$a = Vw$$

In some embodiments, methods include calculating the abundance of one or more fluorophores in the sample from the spectrally resolved light from each fluorophore. In certain instances, the abundance of fluorophores associated with (e.g., chemically associated (i.e., covalently, ionically) or physically associated) a target particle is calculated from the spectrally resolved light from each fluorophore associated with the particle. For instance, in one example the relative abundance of each fluorophore associated with a target particle is calculated from the spectrally resolved light from each fluorophore. In another example, the absolute abundance of each fluorophore associated with the target particle is calculated from the spectrally resolved light from each fluorophore. In certain embodiments, a particle may be identified or classified based on the relative abundance of each fluorophore determined to be associated with the particle. In these embodiments, the particle may be identified or classified by any convenient protocol such as by: comparing the relative or absolute abundance of each fluorophore associated with a particle with a control sample having particles of known identity; or by conducting spectroscopic or other assay analysis of a population of particles (e.g., cells) having the calculated relative or absolute abundance of associated fluorophores.

In certain embodiments, methods include sorting one or more of the particles (e.g., cells) of the sample that are identified based on the estimated abundance of the fluorophores associated with the particle. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of the sample, such as 3 or more components, such as 4 or more components, such as 5 or more components, such as 10 or more components, such as 15 or more components and including sorting 25 or more components of the sample.

In sorting particles identified based on the abundance of fluorophores associated with the particle, methods include data acquisition, analysis and recording, such as with a computer, where multiple data channels record data from each detector used in obtaining the overlapping spectra of the plurality of fluorophores associated with the particle. In these embodiments, analysis includes spectrally resolving light (e.g., by calculating the spectral unmixing matrix) from the plurality of fluorophores having overlapping spectra that are associated with the particle and identifying the particle based on the estimated abundance of each fluorophore associated with the particle. This analysis may be conveyed to a sorting system which is configured to generate a set of digitized parameters based on the particle classification.

In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. Provisional Patent Application No. 62/803,264, filed on Feb. 8, 2019, the disclosure of which is incorporated herein by reference.

Systems for Spectrally Resolving Light from Fluorophores Having Overlapping Fluorescence Spectra in a Sample As summarized above, aspects of the present disclosure include a system for spectrally resolving light from fluorophores having overlapping fluorescence spectra in a sample. As described above, the term "spectrally resolving" is used herein in its conventional sense to refer to spectrally distinguishing each fluorophore in the sample by assigning or attributing the overlapping wavelengths of light to each contributing fluorophore. In embodiments, the overlapping spectral component of fluorescence that is attributed to each fluorophore is determined by calculating a spectral unmixing matrix. In embodiments, the subject systems are used to characterize samples having a plurality of fluorophores where the fluorescence spectra of each fluorophore overlaps with the fluorescence spectra of at least one other fluorophore in the sample. In some instances, the fluorescence spectra of each fluorophore overlaps with the fluorescence spectra of at least one other fluorophore in the sample by 5 nm or more, such as by 10 nm or more, such as by 25 nm or more and including by 50 nm or more. In certain instances, the fluorescence spectra of one or more fluorophores in the sample overlaps with the fluorescence spectra of two or more different fluorophores in the sample, such as where each overlap in fluorescence spectra is by 5 nm or more, such as by 10 nm or more, such as by 25 nm or more and including by 50 nm or more. In embodiments, systems include a light source configured to irradiate a sample having a plurality of fluorophores where the fluorescence spectra of each fluorophore overlaps with the fluorescence spectra of at least one other fluorophore in the sample. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In certain embodiments, the light source is a laser. In some embodiments, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances, the non-laser light source is a stabilized fiber-coupled broadband light source, white light source, among other light sources or any combination thereof.

The light source may be positioned any suitable distance from the sample (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer controlled beam stops for blocking and exposing the sample to the light source.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference. In embodiments, systems include a light detection system having a plurality of photodetectors. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodetector (e.g., photodiode) in the array ranges from 25 to m$^2$ to 10000 µm$^2$, such as from 50 to m$^2$ to 9000 µm$^2$, such as from 75 to m$^2$ to 8000 µm$^2$, such as from 100 to m$^2$ to 7000 µm$^2$, such as from 150 to m$^2$ to 6000 µm$^2$ and including from 200 to m$^2$ to 5000 m$^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm$^2$ to 10000 mm$^2$, such as from 0.5 mm$^2$ to 5000 mm$^2$, such as from 1 mm$^2$ to 1000 mm$^2$, such as from 5 mm$^2$ to 500 mm$^2$, and including from 10 mm$^2$ to 100 mm$^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, photodetectors may be configured to be paired with specific fluorophores, such as those used with the sample in a fluorescence assay. In some embodiments, photodetectors are configured to measure collected light across the entire fluorescence spectrum of each fluorophore in the sample.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments, systems are configured to analyze light from the irradiated sample and spectrally resolve light from each fluorophore in the sample. In some embodiments, systems include memory having instructions stored thereon for determining the overlap between each different fluorophore in the sample and calculating the contribution of each fluorophore to the overlapping fluorescence. In certain embodiments, systems are configured to calculate a spectral unmixing matrix for the fluorescence spectra of the plurality of fluorophores having overlapping fluorescence in the sample detected by the light detection system. As described in greater detail below, systems may also be configured to estimate the abundance of each fluorophore in the sample. In certain embodiments, the abundance of each fluorophore associated with a target particle may be determined. The system may be configured to identify and classify a target particle based on the abundance of each fluorophore associated with the target particle may. In some instances, systems are configured to sort the identified or classified particles. In these embodiments, systems may include computer controlled systems where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a flow cell having a sample in a flow stream with a light source and detecting light from the flow cell with a light detection system having a plurality of photodetectors, calculating a spectral unmixing matrix for the fluorescence spectra of the plurality of fluorophores for each particle detected by the light detection system, estimating the abundance of each fluorophore using the spectral unmixing matrix; and sorting particles in the sample based on the estimated fluorophore abundance.

In some embodiments, systems include a computer having a computer readable storage medium with a computer program stored thereon, where the computer program when loaded on the computer further includes instructions for spectrally resolving light from each fluorophore having overlapping fluorescence by calculating the spectral unmixing matrix using a weighted least squares algorithm. In some instances, the weighted least squares algorithm is calculated according to:

$$\hat{a} = (X^T W X)^{-1} X^T W y$$

where y is measured detector values from the plurality of photodetectors of the light detection system for each cell; â is estimated fluorophore abundance X is spillover; and W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

In some embodiments, each $W_{ii}$ is calculated according to:

$$W_{ii} = \frac{1}{\sigma_i^2} \approx \frac{1}{y_i + \lambda_i}$$

where $\sigma_i^2$ is variance at detector i; $y_i$ is signal at detector i; and $\lambda_i$ is constant noise at detector i. In certain embodiments, the spectral unmixing matrix is calculated according to: $(X^T W X)^{-1} X^T W$. In some instances, the subject systems include memory with instruction to invert $(X^T W X)$ for each cell detected by the light detection system to calculate a spectral unmixing matrix. In certain embodiments, systems include a computer having a computer readable storage medium with a computer program stored thereon, where the computer program when loaded on the computer further includes instructions for approximating the inversion of $(X^T W X)$ in the weighted least square algorithm for each cell detected by the light detection system in order to sort cells in the sample in real time. In some embodiments, the computer program when loaded on the computer further includes instructions for inverting $(X^T W X)$ includes approximating $(X^T W X)$ using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

where $W_G$ is a predetermined approximation of W that is determined from variance of each photodetector in the light detection system.

In some embodiments, systems include a computer having a computer readable storage medium with a computer program stored thereon, where the computer program when loaded on the computer further includes instructions for estimating the variance of each photodetector. In some instances, the instructions include determining the photodetector noise components (e.g., electronic noise, background light, etc.) using a single stain control sample. In other instances, the instructions include determining the variance of each photodetector before irradiating the sample with the light source. In yet other instances, the instructions include determining the predetermined approximation of W, $W_G$, before irradiating the sample with the light source. In certain embodiments, the memory includes instructions stored thereon, which when executed by the processor, cause the processor to precompute $A_0^{-1}$ with the predetermined $W_G$. In these embodiments, the precomputed $A_0^{-1}$ may be stored in the memory and used by the processor as a first approximation of the $A^{-1}$ for each particle detected by the light detection system.

In other embodiments, systems include a processor with memory operably coupled to the processor where the memory includes instructions stored thereon, which when executed by the processor, cause the processor to approximate the weighted least square algorithm for each particle with a Sherman-Morrison iterative inverse updater. In some instances, the memory includes instructions for computing A using the Sherman-Morrison formula:

$$(A_0 + uv^T)^{-1} = A_0^{-1} - \frac{A_0^{-1} u v^T A_0^{-1}}{1 + v^T A_0^{-1} u}$$

In certain instances, the memory includes instructions for precomputing $A_0^{-1}$ to compute the inverse of a perturbation of $A_0$ using the Sherman-Morrison formula. In some embodiments, the inverse of $A_0$ is calculated by the formula $X^T W_0 X$ and the inverse of A is calculated by the formula $X^T W X$. In some instances, the memory includes instructions for calculating $\Delta A$ (i.e., $A - A_0$) as a product of column vectors with each iterative W according to:

$$W_0 = \begin{bmatrix} w_{11}^0 & 0 & \cdots & 0 \\ 0 & w_{22}^0 & \cdots & 0 \\ \vdots & \vdots & \ddots & \vdots \\ 0 & 0 & \cdots & w_{N_D N_D}^0 \end{bmatrix} \text{ and } W = \begin{bmatrix} w_{11} & 0 & \cdots & 0 \\ 0 & w_{22} & \cdots & 0 \\ \vdots & \vdots & \ddots & \vdots \\ 0 & 0 & \cdots & w_{N_D N_D} \end{bmatrix} \text{ where}$$

$$w_{ii} = w_{ii}^0 + \alpha_i \text{ for } i \in [1, N_D].$$

$$W_1 = W_0 + \begin{bmatrix} \alpha_1 & 0 & \cdots & 0 \\ 0 & 0 & \cdots & 0 \\ \vdots & \vdots & \ddots & \vdots \\ 0 & 0 & \cdots & 0 \end{bmatrix}, W_2 = W_1 + \begin{bmatrix} 0 & 0 & \cdots & 0 \\ 0 & \alpha_2 & \cdots & 0 \\ \vdots & \vdots & \ddots & \vdots \\ 0 & 0 & \cdots & 0 \end{bmatrix} \text{ and}$$

$$W = W_{N_D} = W_{N_D - 1} + \begin{bmatrix} 0 & 0 & \cdots & 0 \\ 0 & 0 & \cdots & 0 \\ \vdots & \vdots & \ddots & \vdots \\ 0 & 0 & \cdots & \alpha_{N_D} \end{bmatrix} \text{ and}$$

$$\Delta W_i = W_i - W = \begin{bmatrix} 0 & 0 & 0 & \cdots & 0 \\ \vdots & \ddots & \vdots & \vdots & 0 \\ 0 & \cdots & \alpha_i & \cdots & 0 \\ \vdots & \vdots & \vdots & \ddots & 0 \\ 0 & 0 & 0 & \cdots & 0 \end{bmatrix}$$

According to embodiments, $\Delta A_i = X^T \Delta W_i X = \alpha_i m_i m_i^T$ where A can be expressed as:

$$A = A_0 + \sum_{i=1}^{N_D} \Delta A_i \quad (1)$$

$$= A_0 + \sum_{i=1}^{N_D} \alpha_i m_i m_i^T \quad (2)$$

In these embodiments, each A can be recomputed from $A_0$ with each new weight matrix W (i.e., with different values from $W_0$) using the change to each $w_i$. In some embodiments, systems include a processor with memory operably coupled to the processor where the memory includes instructions stored thereon, which when executed by the processor, cause the processor to perform a Sherman-Morrison iterative inverse updater for approximating the spectral unmixing matrix according to:

$$A^{-1} = \left(A_0 + \sum_{i=1}^{N_D} \Delta A_i\right)^{-1} \quad (3)$$

$$= \left(A_0 + \Delta A_1 + \sum_{i=2}^{N_D} \Delta A_i\right)^{-1} \quad (4)$$

$$= \left(A_1 + \sum_{i=2}^{N_D} \Delta A_i\right)^{-1}, \text{etc...} \quad (5)$$

$$A_i^{-1} = \left(A_{i-1} + \alpha_i m_i m_i^T\right)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

In some embodiments, a precomputed value for $A_0^{-1}$ is used to calculate $A_1^{-1}$. The precomputed $A_1^{-1}$ is then used to calculate $A_2^{-1}$. The value $A^{-1}$ can be calculated by repeat computing of $A_i^{-1}$ using each $(A_{i-1})^{-1}$ from i=1 to $N_D$. In certain embodiments, the subject systems include a field programmable gate array and the spectral unmixing algorithm is calculated for each cell in real time on a field programmable gated array.

In other embodiments, systems include a processor with memory operably coupled to the processor where the memory includes instructions stored thereon, which when executed by the processor, cause the processor to calculate the weighted least square algorithm for each particle by matrix decomposition. In some instances, the memory includes instructions for a LU matrix decomposition, such as where a matrix is decomposed into a product of a lower-triangular (L) matrix and an upper-triangular (U) matrix. In certain instances, LU decomposition includes Gaussian elimination. In other instances, LU decomposition includes a modified Cholesky decomposition, an LDL decomposition where D is diagonal matrix. In certain embodiments, systems include a processor with memory operably coupled to the processor where the memory includes instructions stored thereon, which when executed by the processor, cause the processor to calculate the weighted least squares algorithm (a) using a modified Cholesky decomposition according to:

$$X^T W X a = X^T W y$$

$$A a = B$$

| | |
|---|---|
| $LDL^T a = B$ | LDL decomposition |
| $Lz = B$ where $z = DL^T a$ | Lower- matrix solution triangular |
| $Dx = z$ where $x = L^T a$ | Diagonal matrix solution |
| $L^T a = x$ | Upper- matrix solution triangular |

In other embodiments, systems include a processor with memory operably coupled to the processor where the memory includes instructions stored thereon, which when executed by the processor, cause the processor to calculate a weighted least squares algorithm by QR factorization. In some instances, the QR factorization is a matrix that is the product of an orthogonal (Q) matrix and an upper-triangular (R) matrix. In some embodiments, the memory includes instructions for calculating the weighted least squares algorithm (a) using QR factorization according to:

$$X^T W X a = X^T W y$$
$$\overline{X}^T \overline{X} a = \overline{X}^T \overline{y} \text{ where } QR = \overline{X} (QR)^T QRa = (QR)^T \overline{y}$$
$$R^T Q^T QRa = R^T Q^T \overline{y}$$
$$R^T Ra = R^T Q^T \overline{y}$$
$$Ra = Q^T \overline{y}$$

In yet other embodiments, systems include a processor with memory operably coupled to the processor where the memory includes instructions stored thereon, which when executed by the processor, cause the processor to calculate a weighted least squares algorithm by singular value decomposition (SVD). In some instances, the singular value decomposition is the matrix that is the product $X = U \Sigma V^T$ where U and V are orthogonal matrices and $\Sigma$ is a diagonal matrix containing singular values of $\overline{X}$. In certain instances, the memory includes instructions for calculating the weighted least squares algorithm (a) using singular value decomposition according to:

$$z = U^T y$$
$$\sum w = z$$
$$a = V w$$

In some embodiments, systems include a computer having a computer readable storage medium with a computer program stored thereon, where the computer program when loaded on the computer further includes instructions for calculating the abundance of one or more fluorophores in the sample from the spectrally resolved light from each fluorophore. In certain instances, the abundance of fluorophores associated with (e.g., chemically associated (i.e., covalently, ionically) or physically associated) a target particle is calculated from the spectrally resolved light from each fluorophore associated with the particle. For instance, in one example the relative abundance of each fluorophore associated with a target particle is calculated from the spectrally resolved light from each fluorophore. In another example, the absolute abundance of each fluorophore associated with the target particle is calculated from the spectrally resolved light from each fluorophore.

In certain embodiments, systems are configured to identify or classify a particle based on the relative abundance of each fluorophore determined to be associated with the particle. In these embodiments, the subject systems may be configured to identify or classify the particle by any convenient protocol such as by: comparing the relative or absolute abundance of each fluorophore associated with a particle with a control sample having particles of known identity; or by conducting spectroscopic or other assay analysis of a population of particles (e.g., cells) having the calculated relative or absolute abundance of associated fluorophores.

Systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

In certain embodiments, the subject systems include one or more optical adjustment components for adjusting the light such as light irradiated onto the sample (e.g., from a laser) or light collected from the sample (e.g., scattered, fluorescence). For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam (e.g., reducing the beam profile of a laser)

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In some embodiments, the subject systems include a flow cell nozzle having a nozzle orifice configured to flow a flow stream through the flow cell nozzle. The subject flow cell nozzle has an orifice which propagates a fluidic sample to a sample interrogation region, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more, such as 100 μL/sec or more, such as 150 μL/sec or more, such as 200 μL/sec or more, such as 250 μL/sec or more, such as 300 μL/sec or more, such as 350 L/sec or more, such as 400 μL/sec or more, such as 450 μL/sec or more and including 500 μL/sec or more. For example, the sample flow rate may range from 1 μL/sec to about 500 μL/sec, such as from 2 μL/sec to about 450 μL/sec, such as from 3 μL/sec to about 400 μL/sec, such as from 4 μL/sec to about 350 L/sec, such as from 5 μL/sec to about 300 μL/sec, such as from 6 μL/sec to about 250 μL/sec, such as from 7 μL/sec to about 200 μL/sec, such as from 8 L/sec to about 150 μL/sec, such as from 9 μL/sec to about 125 μL/sec and including from 10 μL/sec to about 100 μL/sec.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 μL/sec or more, such as 50 μL/sec or more, such as 75 μL/sec or more, such as 100 μL/sec or more, such as 250 μL/sec or more, such as 500 L/sec or more, such as 750 μL/sec or more, such as 1000 μL/sec or more and including 2500 μL/sec or more. For example, the sheath fluid flow rate may range from 1 μL/sec to about 500 μL/sec, such as from 2 μL/sec to about 450 μL/sec, such as from 3 μL/sec to about 400 μL/sec, such as from 4 μL/sec to about 350 L/sec, such as from 5 μL/sec to about 300 μL/sec, such as from 6 μL/sec to about 250 μL/sec, such as from 7 μL/sec to about 200 μL/sec, such as from 8 L/sec to about 150 μL/sec, such as from 9 μL/sec to about 125 μL/sec and including from 10 μL/sec to about 100 μL/sec.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The subject systems, in certain instances, include a sample interrogation region in fluid communication with the flow cell nozzle orifice. In these instances, a sample flow stream emanates from an orifice at the distal end of the flow cell nozzle and particles in the flow stream may be irradiated with a light source at the sample interrogation region. The size of the interrogation region may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more.

The interrogation region may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the interrogation region may be formed from any transparent material which passes the desired range of wavelength, including but not limited to optical glass, borosilicate glass, Pyrex glass, ultraviolet quartz, infrared quartz, sapphire as well as plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly ([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly (tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In some embodiments, the subject systems include a cuvette positioned in the sample interrogation region. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In certain embodiments, the subject systems are flow cytometric systems employing the above described weighted least squares algorithm for analyzing and sorting particles in a sample (e.g., cells in a biological sample). Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); Practical *Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5): 502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain embodiments, the subject systems are configured to sort one or more of the particles (e.g., cells) of the sample that are identified based on the estimated abundance of the fluorophores associated with the particle as described above. The term "sorting" is used herein in its conventional sense to refer to separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, particle sorting systems of interest are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g, cells) of the sample are sorted using a sort decision module having a plurality of sort decision units, such as those described in U.S. Provisional Patent Application No. 62/803,264, filed on Feb. 8, 2019, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

Integrated Circuit Devices

Aspects of the present disclosure also include integrated circuit devices programmed to spectrally resolve light from each fluorophore in the sample comprising a plurality of fluorophores having overlapping fluorescence spectra. In some embodiments, integrated circuit devices of interest include a field programmable gate array (FPGA). In other embodiments, integrated circuit devices include an application specific integrated circuit (ASIC). In yet other embodiments, integrated circuit devices include a complex programmable logic device (CPLD). In some embodiments, the subject integrated circuit devices are programmed to determine the overlap between each different fluorophore in the sample and calculate the contribution of each fluorophore to the overlapping fluorescence. In certain embodiments, the integrated circuit is programmed to calculate a spectral unmixing matrix for fluorescence spectra of a plurality of fluorophores having overlapping fluorescence in a sample detected by a light detection system having a plurality of photodetectors. In certain embodiments, integrated circuit devices according to certain embodiments are programmed to calculate a spectral unmixing matrix for fluorescence spectra of a plurality of fluorophores for each cell in a sample. As described in greater detail below, integrated circuit devices may be programmed to estimate the abundance of each fluorophore in the sample. In certain embodiments, the abundance of each fluorophore associated with a target particle may be determined. The integrated circuit may be programmed to identify and classify a target particle based on the abundance of each fluorophore associated with the target particle may. In some instances, integrated circuits are configured to sort the identified or classified particles.

In some embodiments, the integrated circuit is programmed to calculate the spectral unmixing matrix using a weighted least squares algorithm. In some instances, the integrated circuit is programmed to calculate the weighted least squares algorithm according to:

$$â = (X^T W X)^{-1} X^T W y$$

where y is measured detector values from the plurality of photodetectors of the light detection system for each cell; â is estimated fluorophore abundance X is spillover; and W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}.$$

In some embodiments, each $W_{ii}$ is calculated according to:

$$W_{ii} = \frac{1}{\sigma_i^2} \approx \frac{1}{y_i + \lambda_i}$$

where $\sigma_i^2$ is variance at detector i; $y_i$ is signal at detector i; and $\lambda_i$ is constant noise at detector i. In certain embodiments, the field programmable gate array is configured the calculate spectral unmixing matrix according to: $(X^T W X)^{-1} X^T W$. In some instances, the method comprises inverting $(X^T W X)$ for each cell detected by the light detection system to calculate a spectral unmixing matrix. In some instances, the integrated circuit is programmed to invert $(X^T W X)$ for each cell detected by the light detection system to calculate a spectral unmixing matrix.

In certain embodiments, the integrated circuit is programmed to approximate the inversion of $(X^T W X)$ in the weighted least square algorithm for each cell detected in order to sort cells in the sample in real time. In some embodiments, the integrated circuit is configured to invert $(X^T W X)$ by approximating $(X^T W X)$ using an iterative Newton-Raphson calculation according to:

$$A^{-1} = (X^T W X)^{-1};$$

$$A_0^{-1} = (X^T W_G X)^{-1}$$

$$A_{i+1}^{-1} = (2I - A_i^{-1} A) A_i^{-1}$$

where $W_G$ is a predetermined approximation of W that is determined from variance of each photodetector in the light detection system. In some embodiments, the integrated circuit is programmed to further estimate the variance of each photodetector. In certain instances, the integrated circuit is programmed with an estimate of the photodetector noise components based on a single stain control sample. In other instances, the variance of each photodetector is programmed to the integrated circuit before the sample is irradiated with a light source. In still other instances, the predetermined approximation of W in the iterative Newton-Raphson calculation, $W_G$, is programmed into the integrated circuit before the sample is irradiated with a light source. In certain embodiments, the integrated circuit device is programmed to precompute $A_0^{-1}$ with the predetermined $W_G$. In these embodiments, the precomputed $A_0^{-1}$ may be programmed into the integrated circuit device and used as a first approximation of the $A^{-1}$ for each particle detected by the light detection system.

In other embodiments, integrated circuit devices of interest are programmed to approximate the weighted least square algorithm for each particle with a Sherman-Morrison iterative inverse updater. In some instances, the integrated circuit device is programmed for computing A using the Sherman-Morrison formula:

$$(A_0 + uv^T)^{-1} = A_0^{-1} - \frac{A_0^{-1} uv^T A_0^{-1}}{1 + v^T A_0^{-1} u}$$

In certain instances, the integrated circuit device is programmed for precomputing $A_0^{-1}$ to compute the inverse of a perturbation of $A_0$ using the Sherman-Morrison formula. In some embodiments, the inverse of $A_0$ is calculated by the formula $X^T W_0 X$ and the inverse of A is calculated by the formula $X^T W X$. In some instances, the integrated circuit device is programmed to calculate $\Delta A$ (i.e., $A-A_0$) as a product of column vectors with each iterative W according to:

$$W_0 = \begin{bmatrix} w_{11}^0 & 0 & \cdots & 0 \\ 0 & w_{22}^0 & \cdots & 0 \\ \vdots & \vdots & \ddots & \vdots \\ 0 & 0 & \cdots & w_{N_D N_D}^0 \end{bmatrix} \text{ and } W = \begin{bmatrix} w_{11} & 0 & \cdots & 0 \\ 0 & w_{22} & \cdots & 0 \\ \vdots & \vdots & \ddots & \vdots \\ 0 & 0 & \cdots & w_{N_D N_D} \end{bmatrix} \text{ where}$$

$$w_{ii} = w_{ii}^0 + \alpha_i \text{ for } i \in [1, N_D].$$

$$W_1 = W_0 + \begin{bmatrix} \alpha_1 & 0 & \cdots & 0 \\ 0 & 0 & \cdots & 0 \\ \vdots & \vdots & \ddots & \vdots \\ 0 & 0 & \cdots & 0 \end{bmatrix}, W_2 = W_1 + \begin{bmatrix} 0 & 0 & \cdots & 0 \\ 0 & \alpha_2 & \cdots & 0 \\ \vdots & \vdots & \ddots & \vdots \\ 0 & 0 & \cdots & 0 \end{bmatrix} \text{ and}$$

$$W = W_{N_D} = W_{N_D - 1} + \begin{bmatrix} 0 & 0 & \cdots & 0 \\ 0 & 0 & \cdots & 0 \\ \vdots & \vdots & \ddots & \vdots \\ 0 & 0 & \cdots & \alpha_{N_D} \end{bmatrix} \text{ and}$$

$$\Delta W_i = W_i - W = \begin{bmatrix} 0 & 0 & 0 & \cdots & 0 \\ \vdots & \ddots & \vdots & \vdots & 0 \\ 0 & \cdots & \alpha_i & \cdots & 0 \\ \vdots & \vdots & \vdots & \ddots & 0 \\ 0 & 0 & 0 & \cdots & 0 \end{bmatrix}$$

According to embodiments, $\Delta A_i = X^T \Delta W_i X = a_i m_i m_i^T$ where A can be expressed as:

$$A = A_0 + \sum_{i=1}^{N_D} \Delta A_i \quad (1)$$

$$= A_0 + \sum_{i=1}^{N_D} \alpha_i m_i m_i^T \quad (2)$$

In these embodiments, each A can be recomputed from $A_0$ with each new weight matrix W (i.e., with different values from $W_0$) using the change to each $w_i$. In some embodiments, the integrated circuit device is programmed to perform a Sherman-Morrison iterative inverse updater for approximating the spectral unmixing matrix according to:

$$A^{-1} = \left( A_0 + \sum_{i=1}^{N_D} \Delta A_i \right)^{-1} \quad (3)$$

$$= \left( A_0 + \Delta A_1 + \sum_{i=2}^{N_D} \Delta A_i \right)^{-1} \quad (4)$$

$$= \left( A_1 + \sum_{i=2}^{N_D} \Delta A_i \right)^{-1}, \text{ etc...} \quad (5)$$

$$A_i^{-1} = \left( A_{i-1}^{-1} + \alpha_i m_i m_i^T \right)^{-1} \quad (6)$$

$$= A_{i-1}^{-1} - \frac{A_{i-1}^{-1} + \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

In some embodiments, a precomputed value for $A_0^{-1}$ is used to calculate $A_1^{-1}$. The precomputed $A_1^{-1}$ is then used to calculate $A_2^{-1}$. The value $A^{-1}$ can be calculated by repeat computing of $A_i^{-1}$ using each $(A_{i-1})^{-1}$ from i=1 to $N_D$.

In other embodiments, integrated circuit devices of interest are programmed to calculate the weighted least square algorithm for each particle by matrix decomposition. In some instances, the integrated circuit device is programmed for instructions for a LU matrix decomposition, such as where a matrix is decomposed into a product of a lower-triangular (L) matrix and an upper-triangular (U) matrix. In certain instances, LU decomposition includes Gaussian elimination. In other instances, LU decomposition includes a modified Cholesky decomposition, an LDL decomposition where D is diagonal matrix. In certain embodiments, integrated circuit devices are programmed to calculate the weighted least squares algorithm (a) using a modified Cholesky decomposition according to:

$$X^T W X a = X^T W y$$

$$Aa = B$$

| | |
|---|---|
| $LDL^T a = B$ | LDL decomposition |
| $Lz = B$ where $z = DL^T a$ | Lower- matrix solution triangular |
| $Dx = z$ where $x = L^T a$ | Diagonal matrix solution |
| $L^T a = x$ | Upper- matrix solution triangular |

In other embodiments, integrated circuit devices are programmed to calculate a weighted least squares algorithm by QR factorization. In some instances, the QR factorization is a matrix that is the product of an orthogonal (Q) matrix and an upper-triangular (R) matrix. In some embodiments, integrated circuit devices are programmed to calculate the weighted least squares algorithm (a) using QR factorization according to:

$$X^T W X a = X^T W y$$

$$\overline{X}^T \overline{X} a = \overline{X}^T \overline{y} \text{ where } QR = \overline{X} (QR)^T QR a = (QR)^T \overline{y}$$

$$R^T Q^T Q R a = R^T Q^T \overline{y}$$

$$R^T R a = R^T Q^T \overline{y}$$

$$R a = Q^T \overline{y}$$

In yet other embodiments, integrated circuit devices are programmed to calculate a weighted least squares algorithm by singular value decomposition (SVD). In some instances, the singular value decomposition is the matrix that is the product $X = U\Sigma V^T$ where U and V are orthogonal matrices and $\Sigma$ is a diagonal matrix containing singular values of $\overline{X}$. In certain instances, integrated circuit devices are programmed to calculate the weighted least squares algorithm (a) using singular value decomposition according to:

$$z = U^T y$$
$$\sum w = z$$
$$a = Vw$$

In some embodiments, integrated circuits of interest are programmed to calculate the abundance of one or more fluorophores in the sample from the spectrally resolved light from each fluorophore. In certain instances, the abundance of fluorophores associated with (e.g., chemically associated (i.e., covalently, ionically) or physically associated) a target particle is calculated from the spectrally resolved light from each fluorophore associated with the particle. For instance, in one example the integrated circuit is programmed to calculate the relative abundance of each fluorophore associated with a target particle from the spectrally resolved light from each fluorophore. In another example, the integrated circuit is programmed to calculate the absolute abundance of each fluorophore associated with the target particle from the spectrally resolved light from each fluorophore.

In certain embodiments, the integrated circuit is programmed to identify or classify a particle based on the relative abundance of each fluorophore determined to be associated with the particle. In these embodiments, the integrated circuits may be programmed to identify or classify the particle by any convenient protocol such as by: comparing the relative or absolute abundance of each fluorophore associated with a particle with a control sample having particles of known identity; or by conducting spectroscopic or other assay analysis of a population of particles (e.g., cells) having the calculated relative or absolute abundance of associated fluorophores.

Kits

Aspects of the present disclosure further include kits, where kits include one or more of the integrated circuits described herein. In some embodiments, kits may further include programming for the subject systems, such as in the form of a computer readable medium (e.g., flash drive, USB storage, compact disk, DVD, Blu-ray disk, etc.) or instructions for downloading the programming from an internet web protocol or cloud server. Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods and computer systems find use in a variety of applications where it is desirable to analyze and sort particle components in a sample in a fluid medium, such as a biological sample. In some embodiments, the systems and methods described herein find use in flow cytometry characterization of biological samples labelled with fluorescent tags. In other embodiments, the systems and methods find use in spectroscopy of emitted light. In addition, the subject systems and methods find use in increasing the obtainable signal from light collected from a sample (e.g., in a flow stream). In certain instances, the present disclosure finds use in enhancing measurement of light collected from a sample that is irradiated in a flow stream in a flow cytometer. Embodiments of the present disclosure find use where it is desirable to provide a flow cytometer with improved cell sorting accuracy, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Aspects, including embodiments, of the subject matter described herein may be beneficial alone or in combination, with one or more other aspects or embodiments. Without limiting the description, certain non-limiting aspects of the disclosure numbered 1-320 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

1. A method comprising:
   detecting light with a light detection system from a sample comprising a plurality of fluorophores having overlapping fluorescence spectra; and
   spectrally resolving light from each fluorophore in the sample.
2. The method according to 1, wherein the fluorescence spectra of each fluorophore overlaps with the fluorescence spectra of at least one other fluorophore in the sample.
3. The method according to 2, wherein the fluorescence spectra of each fluorophore overlaps with the fluorescence spectra of at least one other fluorophore in the sample by 10 nm or more.
4. The method according to 2, wherein the fluorescence spectra of each fluorophore overlaps with the fluorescence spectra of at least one other fluorophore in the sample by 25 nm or more.
5. The method according to 1, wherein the fluorescence spectra of at least one fluorophore in the sample overlaps with the fluorescence spectra of two different fluorophores in the sample.

6. The method according to 5, wherein the fluorescence spectra of at least one fluorophore in the sample overlaps with the fluorescence spectra of two different fluorophores in the sample by 10 nm or more.

7. The method according to 5, wherein the fluorescence spectra of at least one fluorophore in the sample overlaps with the fluorescence spectra of two different fluorophores in the sample by 25 nm or more.

8. The method according to any one of 1-7, wherein spectrally resolving light from each fluorophore comprises calculating a spectral unmixing matrix for the fluorescence spectra of each fluorophore in the sample.

9. The method according to 8, wherein the method comprises calculating the spectral unmixing matrix using a weighted least squares algorithm.

10. The method according to 9, wherein the weighted least squares algorithm is calculated according to:

$$\hat{a} = (X^T W X)^{-1} X^T W y$$

wherein:
y is measured detector values from the plurality of photodetectors of the light detection system for each cell;
$\hat{a}$ is estimated fluorophore abundance;
X is spillover; and
W is $$\begin{bmatrix} W_{ii} & 0 & \ldots & 0 \\ 0 & W_{i+1,i+1} & \ldots & 0 \\ \vdots & \vdots & \ddots & \vdots \\ 0 & 0 & \ldots & W_{i+n,i+n} \end{bmatrix}$$

11. The method according to 10, wherein each $W_{ii}$ is calculated according to:

$$W_{ii} = \frac{1}{\sigma_i^2} \approx \frac{1}{y_i + \lambda_i}$$

wherein:
$\sigma_i^2$ is variance at detector i;
$y_i$ is signal at detector i; and
$\lambda_i$ is constant noise at detector i.

12. The method according to any one of 9-11, wherein the method comprises calculating the spectral unmixing matrix according to:

$$(X^T W X)^{-1} X^T W$$

13. The method according to any one of 9-11, wherein the method comprises inverting ($X^T W X$) for each cell to calculate the spectral unmixing matrix.

14. The method according to 13, wherein inverting ($X^T W X$) comprises approximating ($X^T W X$) using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

wherein $W_G$ is a predetermined approximation of W that is determined from variance of each photodetector in the light detection system.

15. The method according to 14, further comprising determining $W_G$ before irradiating the sample with the light source.

16. The method according to 15, further comprising precomputing $A_0^{-1}$ with the calculated $W_G$ value.

17. The method according to any one of 9-13, wherein the method comprises approximating ($X^T W X$) using a Sherman-Morrison iterative inverse updater according to:

$$(A_0 + uv^T)^{-1} = A_0^{-1} - \frac{A_0^{-1} u v^T A_0^{-1}}{1 + v^T A_0^{-1} u}.$$

18. The method according to 17, wherein $\Delta A_i = X^T \Delta W_i X = \alpha_i m_i m_i^T$ wherein:

$$A = A_0 + \sum_{i=1}^{N_D} \Delta A_i \quad (1)$$

$$= A_0 + \sum_{i=1}^{N_D} \alpha_i m_i m_i^T \quad (2)$$

19. The method according to 18, further comprising approximating the spectral unmixing matrix according to:

$$A^{-1} = \left(A_0 + \sum_{i=1}^{N_D} \Delta A_i\right)^{-1} \quad (3)$$

$$= \left(A_0 + \Delta A_1 + \sum_{i=2}^{N_D} \Delta A_i\right)^{-1} \quad (4)$$

$$= \left(A_1 + \sum_{i=2}^{N_D} \Delta A_i\right)^{-1}, \text{etc...} \quad (5)$$

$$A_i^{-1} = (A_{i-1}^{-1} + \alpha_i m_i m_i^T)^{-1} \quad (6)$$

$$= A_{i-1}^{-1} - \frac{A_{i-1}^{-1} + \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

20. The method according to 19, wherein a precomputed value for $A_0^{-1}$ is used to calculate $A_1^{-1}$ and $A^{-1}$ is calculated by repeat computing of $A_i^{-1}$ using each $(A_{i-1})^{-1}$ from i=1 to $N_D$.

21. The method according to any one of 9-13, wherein the weighted least squares algorithm is calculated by matrix decomposition.

22. The method according to 21, wherein the matrix decomposition comprises LU decomposition.

23. The method according to 22, wherein the weighted least squares algorithm is calculated using a modified Cholesky decomposition according to:

$$X^T W X a = X^T W y$$
$$A a = B$$
$$L D L^T a = B$$
$$L z = B \text{ where } z = D L^T a$$
$$D x = z \text{ where } x = L^T a$$
$$L^T a = x$$

24. The method according to 21, wherein the weighted least squares algorithm is calculated by QR factorization.
25. The method according to 24, wherein the weighted least squares algorithm is calculated using QR factorization according to:

$$X^T W X a = X^T W y$$
$$\overline{X}^T \overline{X} a = \overline{X}^T \overline{y} \text{ where } QR = \overline{X}$$
$$(QR)^T QR a = (QR)^T \overline{y}$$
$$R^T Q^T QR a = R^T Q^T \overline{y}$$
$$R^T R a = R^T Q^T \overline{y}$$
$$R a = Q^T \overline{y}$$

26. The method according to 21, wherein the weighted least squares algorithm is calculated by singular value decomposition.
27. The method according to 26, wherein the weighted least squares algorithm is calculated using singular value decomposition according to:

$$z = U^T y$$
$$\Sigma w = z$$
$$a = V w,$$

wherein U and V are orthogonal matrices and $\Sigma$ is a diagonal matrix containing singular values of $\overline{X}$.

28. The method according to any one of 13-27, wherein the spectral unmixing matrix is calculated on a field programmable gated array.
29. The method according to any one of 1-28, further comprising irradiating the sample with a light source.
30. The method according to 29, wherein the light source comprises a laser.
31. The method according to 30, wherein the light source comprises a plurality of lasers.
32. The method according to any one of 1-31, wherein the light detection system comprises a plurality of photodetectors.
33. The method according to 32, wherein the photodetectors comprise one or more photomultiplier tubes.
34. The method according to any one of 1-31, wherein the light detection system comprises a photodetector array.
35. The method according to 34, wherein the photodetector array comprises photodiodes.
36. The method according to 34, wherein the photodetector array comprises charge coupled devices.
37. A system comprising:
a light source configured to irradiate a sample comprising a plurality of fluorophores having overlapping fluorescence spectra;
a light detection system comprising a plurality of photodetectors; and
a processor comprising memory operably coupled to the processor wherein the memory comprises instructions stored thereon, which when executed by the processor, cause the processor to spectrally resolve light from each fluorophore in the sample.
38. The system according to 37, wherein the fluorescence spectra of each fluorophore overlaps with the fluorescence spectra of at least one other fluorophore in the sample.
39. The system according to 38, wherein the fluorescence spectra of each fluorophore overlaps with the fluorescence spectra of at least one other fluorophore in the sample by 10 nm or more.
40. The system according to 38, wherein the fluorescence spectra of each fluorophore overlaps with the fluorescence spectra of at least one other fluorophore in the sample by 25 nm or more.
41. The system according to 37, wherein the fluorescence spectra of at least one fluorophore in the sample overlaps with the fluorescence spectra of two different fluorophores in the sample.
42. The system according to 41, wherein the fluorescence spectra of at least one fluorophore in the sample overlaps with the fluorescence spectra of two different fluorophores in the sample by 10 nm or more.
43. The system according to 41, wherein the fluorescence spectra of at least one fluorophore in the sample overlaps with the fluorescence spectra of two different fluorophores in the sample by 25 nm or more.
44. The system according to any one of 37-43, wherein the memory comprises instructions stored thereon, which when executed by the processor, cause the processor to calculate a spectral unmixing matrix for the fluorescence spectra of each fluorophore in the sample.
45. The system according to 44, wherein the memory comprises instructions stored thereon, which when executed by the processor, cause the processor to calculate the spectral unmixing matrix by a weighted least squares algorithm.
46. The system according to 45, wherein the weighted least squares algorithm is calculated according to:

$$\hat{a} = \left(X^T W X\right)^{-1} X^T W y$$

wherein:
y is measured detector values from the plurality of photodetectors of the light detection system for each cell;
$\hat{a}$ is estimated fluorophore abundance;
X is spillover; and $$W \text{ is } \begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

47. The system according to 46, wherein each $W_{ii}$ is calculated according to:

$$W_{ii} = \frac{1}{\sigma_i^2} \approx \frac{1}{y_i + \lambda_i}$$

wherein:
$\sigma_i^2$ is variance at detector i;
$y_i$ is signal at detector i; and
$\lambda_i$ is constant noise at detector i.

48. The system according to any one of 45-47, wherein the memory comprises instructions stored thereon, which when executed by the processor, cause the processor to calculate the spectral unmixing matrix according to:

$$(X^T W X)^{-1} X^T W$$

49. The system according to 48, wherein $(X^T W X)$ is inverted for each cell detected by the light detection system to calculate a spectral unmixing matrix.

50. The system according to 49, wherein the inversion of $(X^T W X)$ is approximated using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

wherein $W_G$ is a predetermined approximation of W that is determined from variance of each photodetector in the light detection system.

51. The system according to 50, wherein variance of the photodetector comprises a photodetector noise component.

52. The system according to 51, wherein the photodetector noise component comprises one or more of electronic noise and optical background light.

53. The system according to any one of 51-52, wherein variance of the photodetector is proportional to measured intensity of light by the photodetector.

54. The system according to any one of 51-53, wherein the photodetector noise component is estimated using a single stain control sample.

55. The system according to any one of 51-54, wherein the memory comprises instructions stored thereon, which when executed by the processor, cause the processor to automatically determine the variance of each photodetector before irradiating the sample with the light source.

56. The system according to any one of 51-55, wherein the memory comprises instructions stored thereon, which when executed by the processor, cause the processor to automatically determine $W_G$ before irradiating the sample with the light source.

57. The system according to 56, wherein the memory comprises instructions stored thereon, which when executed by the processor, cause the processor to calculate $A_0^{-1}$ based on the determined $W_G$ value.

58. The system according to any one of 44-49, wherein the memory comprises instructions stored thereon, which when executed by the processor, cause the processor to approximate $(X^T W X)$ using a Sherman-Morrison iterative inverse updater according to:

$$(A_0 + uv^T)^{-1} = A_0^{-1} - \frac{A_0^{-1} uv^T A_0^{-1}}{1 + v^T A_0^{-1} u}.$$

59. The system according to 58, wherein $\Delta A_i = X^T \Delta W_i X = a_i m_i m_i^T$ wherein:

$$A = A_0 + \sum_{i=1}^{N_D} \Delta A_i \quad (1)$$

$$= A_0 + \sum_{i=1}^{N_D} \alpha_i m_i m_i^T \quad (2)$$

60. The system according to 59, wherein the memory comprises instructions stored thereon, which when executed by the processor, cause the processor to approximate the spectral unmixing matrix according to:

$$A^{-1} = \left(A_0 + \sum_{i=1}^{N_D} \Delta A_i\right)^{-1} \quad (3)$$

$$= \left(A_0 + \Delta A_i + \sum_{i=2}^{N_D} \Delta A_i\right)^{-1} \quad (4)$$

$$= \left(A_1 + \sum_{i=2}^{N_D} \Delta A_i\right)^{-1}, \text{ etc...} \quad (5)$$

$$A_i^{-1} = (A_{i-1} + \alpha_i m_i m_i^T)^{-1} \quad (6)$$

$$= A_{i-1}^{-1} - \frac{A_{i-1}^{-1} \alpha_i m_i m_i^T A_{i-1}^{-1}}{1 + \alpha_i m_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

61. The system according to 60, wherein a precomputed value for $A_0^{-1}$ is used to calculate $A_1^{-1}$ and $A^{-1}$ is calculated by repeat computing of $A_i^{-1}$ using each $(A_{i-1})^{-1}$ from i=1 to $N_D$.

62. The system according to any one of 44-49, wherein the memory comprises instructions stored thereon, which when executed by the processor, cause the processor to calculate the weighted least squares algorithm by matrix decomposition.

63. The system according to 62, wherein the matrix decomposition comprises LU decomposition.

64. The system according to 63, wherein the memory comprises instructions stored thereon, which when executed by the processor, cause the processor to calculate the weighted least squares algorithm using a modified Cholesky decomposition according to:

$$X^T W X a = X^T W y$$

$$Aa = B$$

-continued
$$LDL^T a = B$$
$$Lz = B \text{ where } z = DL^T a$$
$$Dx = z \text{ where } x = L^T a$$
$$L^T a = x$$

65. The system according to 62, wherein the memory comprises instructions stored thereon, which when executed by the processor, cause the processor to calculate the weighted least squares algorithm by QR factorization.
66. The system according to 65, wherein the memory comprises instructions stored thereon, which when executed by the processor, cause the processor to calculate the weighted least squares algorithm using QR factorization according to:

$$X^T W X a = X^T W y$$
$$\overline{X}^T \overline{X} a = \overline{X}^T \overline{y} \text{ where } QR = \overline{X}$$
$$(QR)^T QRa = (QR)^T \overline{y}$$
$$R^T Q^T QRa = R^T Q^T \overline{y}$$
$$R^T Ra = R^T Q^T \overline{y}$$
$$Ra = Q^T \overline{y}$$

67. The system according to 62, wherein the memory comprises instructions stored thereon, which when executed by the processor, cause the processor to calculate the weighted least squares algorithm by singular value decomposition.
68. The system according to 67, wherein the memory comprises instructions stored thereon, which when executed by the processor, cause the processor to calculate the weighted least squares algorithm using singular value decomposition according to:

$$z = U^T y$$
$$\Sigma w = z$$
$$a = Vw,$$

wherein U and V are orthogonal matrices and $\Sigma$ is a diagonal matrix containing singular values of $\overline{X}$.
69. The system according to any one of 37-68, wherein the spectral unmixing matrix is calculated on a field programmable gated array.
70. The system according to any one of 37-69, wherein the light source comprises a laser.
71. The system according to 70, wherein the light source comprises a plurality of lasers.
72. The system according to any one of 37-71, wherein the light detection system comprises photomultiplier tubes.
73. The system according to any one of 37-72, wherein the light detection system comprises a photodetector array.
74. The system according to 73, wherein the photodetector array comprises photodiodes.
75. The system according to 74, wherein the photodetector array comprises charge coupled devices.
76. An integrated circuit programmed to spectrally resolve light from each fluorophore in the sample comprising a plurality of fluorophores having overlapping fluorescence spectra.
77. The integrated circuit according to 76, wherein the fluorescence spectra of each fluorophore overlaps with the fluorescence spectra of at least one other fluorophore in the sample.
78. The integrated circuit according to 77, wherein the fluorescence spectra of each fluorophore overlaps with the fluorescence spectra of at least one other fluorophore in the sample by 10 nm or more.
79. The integrated circuit according to 77, wherein the fluorescence spectra of each fluorophore overlaps with the fluorescence spectra of at least one other fluorophore in the sample by 25 nm or more.
80. The integrated circuit according to 76, wherein the fluorescence spectra of at least one fluorophore in the sample overlaps with the fluorescence spectra of two different fluorophores in the sample.
81. The integrated circuit according to 80, wherein the fluorescence spectra of at least one fluorophore in the sample overlaps with the fluorescence spectra of two different fluorophores in the sample by 10 nm or more.
82. The integrated circuit according to 80, wherein the fluorescence spectra of at least one fluorophore in the sample overlaps with the fluorescence spectra of two different fluorophores in the sample by 25 nm or more.
83. The integrated circuit according to any one of 76-82, wherein the integrated circuit is programmed to calculate a spectral unmixing matrix for the fluorescence spectra of each fluorophore in the sample.
84. The integrated circuit according to 83, wherein the integrated circuit is programmed to calculate the spectral unmixing matrix by a weighted least squares algorithm.
85. The integrated circuit according to 84, wherein the weighted least squares algorithm is calculated according to:

$$\hat{a} = (X^T W X)^{-1} X^T W y$$

wherein:
y is measured detector values from the plurality of photodetectors of the light detection system for each cell;
$\hat{a}$ is estimated fluorophore abundance;
X is spillover; and
W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

86. The integrated circuit according to 85, wherein each $W_{ii}$ is calculated according to:

$$W_{ii} = \frac{1}{\sigma_i^2} \approx \frac{1}{y_i + \lambda_i}$$

wherein:
$\sigma_i^2$ is variance at detector i;
$y_i$ is signal at detector i; and
$\lambda_i$ is constant noise at detector i.

87. The integrated circuit according to any one of 84-86, wherein the integrated circuit is programmed to calculate the spectral unmixing matrix according to:

$$(X^T W X)^{-1} X^T W$$

88. The integrated circuit according to 87, wherein $(X^T W X)$ is inverted for each cell detected by the light detection system to calculate a spectral unmixing matrix.

89. The integrated circuit according to 88, wherein the inversion of $(X^T W X)$ is approximated using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

wherein $W_G$ is a predetermined approximation of $W$ that is determined from variance of each photodetector in a light detection system for detecting fluorescence from the fluorophores in the sample.

90. The integrated circuit according to 89, wherein the integrated circuit is programmed to automatically determine $W_G$ before irradiating the sample with the light source.

91. The integrated circuit according to 90, wherein the integrated circuit is programmed to calculate $A_0^{-1}$ based on the determined $W_G$ value.

92. The integrated circuit according to any one of 83-88, wherein the integrated circuit is programmed to approximate $(X^T W X)$ using a Sherman-Morrison iterative inverse updater according to:

$$(A_0 + uv^T)^{-1} = A_0^{-1} - \frac{A_0^{-1} u v^T A_0^{-1}}{1 + v^T A_0^{-1} u}.$$

93. The integrated circuit according to claim 92, wherein $\Delta A_i = X^T \Delta W_i X = a_i m_i m_i^T$ wherein:

$$A = A_0 + \sum_{i=1}^{N_D} \Delta A_i \quad (1)$$

$$= A_0 + \sum_{i=1}^{N_D} \alpha_i m_i m_i^T \quad (2)$$

94. The integrated circuit according to 93, wherein the integrated circuit is programmed to approximate the spectral unmixing matrix according to:

$$A^{-1} = \left(A_0 + \sum_{i=1}^{N_D} \Delta A_i\right)^{-1} \quad (3)$$

$$= \left(A_0 + \Delta A_i + \sum_{i=2}^{N_D} \Delta A_i\right)^{-1} \quad (4)$$

$$= \left(A_1 + \sum_{i=2}^{N_D} \Delta A_i\right)^{-1}, \text{ etc...} \quad (5)$$

$$A_i^{-1} = (A_{i-1} + \alpha_i m_i m_i^T)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} \alpha_i} \quad (7)$$

$$= A_{i-1}^{-1} \frac{\alpha_i}{1 + \alpha_i m_i^T A_{i-1}^{-1} m_i} A_{i-1}^{-1} m_i m_i^T A_{i-1}^{-1} \quad (8)$$

95. The integrated circuit according to 94, wherein a precomputed value for $A_0^{-1}$ is used to calculate $A_1^{-1}$ and $A^{-1}$ is calculated by repeat computing of $A_i^{-1}$ using each $(A_{i-1})^{-1}$ from i=1 to $N_D$.

96. The integrated circuit according to 84, wherein the integrated circuit is programmed to calculate the weighted least squares algorithm by matrix decomposition.

97. The integrated circuit according to 96, wherein the matrix decomposition comprises LU decomposition.

98. The integrated circuit according to 97, wherein the integrated circuit is programmed to calculate the weighted least squares algorithm using a modified Cholesky decomposition according to:

$$X^T W X a = X^T W y$$
$$A a = B$$
$$L D L^T a = B$$
$$L z = B \text{ where } z = D L^T a$$
$$D x = z \text{ where } x = L^T a$$
$$L^T a = x$$

99. The integrated circuit according to 96, wherein the integrated circuit is programmed to calculate the weighted least squares algorithm by QR factorization.

100. The integrated circuit according to 99, wherein the integrated circuit is programmed to calculate the weighted least squares algorithm using QR factorization according to:

$$X^T W X a = X^T W y$$
$$\overline{X}^T \overline{X} a = \overline{X}^T \overline{y} \text{ where } QR = \overline{X}$$
$$(QR)^T QR a = (QR)^T \overline{y}$$
$$R^T Q^T QR a = R^T Q^T \overline{y}$$
$$R^T R a = R^T Q^T \overline{y}$$
$$R a = Q^T \overline{y}$$

101. The integrated circuit according to 96, wherein the integrated circuit is programmed to calculate the weighted least squares algorithm by singular value decomposition.

102. The integrated circuit according to 101, wherein the integrated circuit is programmed to calculate the weighted least squares algorithm using singular value decomposition according to:

$$z = U^T y$$
$$\Sigma w = z$$
$$a = Vw,$$

wherein U and V are orthogonal matrices and $\Sigma$ is a diagonal matrix containing singular values of X.

103. The integrated circuit according to any one of 76-102, wherein the integrated circuit is a field programmable gate array (FPGA).

104. The integrated circuit according to any one of claims 76-102, wherein the integrated circuit is an application specific integrated circuit (ASIC).

105. The integrated circuit according to any one of 62-102, wherein the integrated circuit is a complex programmable logic device (CPLD).

106. A method comprising:
  detecting light with a light detection system from a sample comprising a plurality of fluorophores, the fluorophores having overlapping fluorescence spectra; and
  estimating an abundance of one or more of the fluorophores on a particle in the sample.

107. The method according to 106, wherein the fluorescence spectra of each fluorophore overlaps with the fluorescence spectra of at least one other fluorophore in the sample.

108. The method according to 107, wherein the fluorescence spectra of each fluorophore overlaps with the fluorescence spectra of at least one other fluorophore in the sample by 10 nm or more.

109. The method according to 107, wherein the fluorescence spectra of each fluorophore overlaps with the fluorescence spectra of at least one other fluorophore in the sample by 25 nm or more.

110. The method according to 106, wherein the fluorescence spectra of at least one fluorophore in the sample overlaps with the fluorescence spectra of two different fluorophores in the sample.

111. The method according to 110, wherein the fluorescence spectra of at least one fluorophore in the sample overlaps with the fluorescence spectra of two different fluorophores in the sample by 10 nm or more.

112. The method according to 111, wherein the fluorescence spectra of at least one fluorophore in the sample overlaps with the fluorescence spectra of two different fluorophores in the sample by 25 nm or more.

113. The method according to any one of 106-112, wherein estimating the abundance of the fluorophores comprises spectrally resolving the light from each fluorophore on the particle.

114. The method according to 113, wherein spectrally resolving light from each fluorophore comprises calculating a spectral unmixing matrix for the fluorescence spectra of each fluorophore on the particle.

115. The method according to 114, wherein the method comprises calculating the spectral unmixing matrix using a weighted least squares algorithm.

116. The method according to 115, wherein the weighted least squares algorithm is calculated according to:

$$\hat{a} = (X^T W X)^{-1} X^T W y$$

wherein:
y is measured detector values from the plurality of photodetectors of the light detection system for each cell;
$\hat{a}$ is estimated fluorophore abundance;
X is spillover; and
W is $$\begin{bmatrix} W_{ii} & 0 & \ldots & 0 \\ 0 & W_{i+1,i+1} & \ldots & 0 \\ \vdots & \vdots & \ddots & \vdots \\ 0 & 0 & \ldots & W_{i+n,i+n} \end{bmatrix}$$

117. The method according to 116, wherein each $W_{ii}$ is calculated according to:

$$W_{ii} = \frac{1}{\sigma_i^2} \approx \frac{1}{y_i + \lambda_i}$$

wherein:
$\sigma_i^2$ is variance at detector i;
$y_i$ is signal at detector i; and
$\lambda_i$ is constant noise at detector i.

118. The method according to any one of 115-117, wherein the method comprises calculating the spectral unmixing matrix according to:

$(X^T W X)^{-1} X^T W$

119. The method according to any one of 115-117, wherein the method comprises inverting $(X^T W X)$ for each cell to calculate the spectral unmixing matrix.

120. The method according to 119, wherein inverting $(X^T W X)$ comprises approximating $(X^T W X)$ using an iterative Newton-Raphson calculation according $$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

wherein $W_G$ is a predetermined approximation of W that is determined from variance of each photodetector in the light detection system.

121. The method according to 120, further comprising determining $W_G$ before irradiating the sample with the light source.

122. The method according to 121, further comprising precomputing $A_0^{-1}$ with the calculated $W_G$ value.

123. The method according to any one of 114-119, wherein the method comprises approximating $(X^T W X)$ using a Sherman-Morrison iterative inverse updater according to:

$$(A_0 + uv^T)^{-1} = A_0^{-1} - \frac{A_0^{-1} uv^T A_0^{-1}}{1 + v^T A_0^{-1} u}.$$

124. The method according to 123, wherein $\Delta A = X^T \Delta W_i X = a_i m_i m_i^T$ wherein:

$$A = A_0 + \sum_{i=1}^{N_D} \Delta A_i \quad (1)$$

$$= A_0 + \sum_{i=1}^{N_D} \alpha_i m_i m_i^T \quad (2)$$

125. The method according to 124, further comprising approximating the spectral unmixing matrix according to:

$$A^{-1} = \left(A_0 + \sum_{i=1}^{N_D} \Delta A_i\right)^{-1} \quad (3)$$

$$= \left(A_0 + \Delta A_i + \sum_{i=1}^{N_D} \Delta A_i\right)^{-1} \quad (4)$$

$$= \left(A_1 + \sum_{i=2}^{N_D} \Delta A_i\right)^{-1}, \text{etc...} \quad (5)$$

$$A_{i-1}^{-1} = (A_{i-1} + \alpha_i m_i m_i^T)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

126. The method according to 125, wherein a precomputed value for $A_0^{-1}$ is used to calculate $A_1^{-1}$ and $A^{-1}$ is calculated by repeat computing of $A_i^{-1}$ using each $(A_{i-1})^{-1}$ from i=1 to $N_D$.
127. The method according to any one of 114-119, wherein the weighted least squares algorithm is calculated by matrix decomposition.
128. The method according to 127, wherein the matrix decomposition comprises LU decomposition.
129. The method according to 128, wherein the weighted least squares algorithm is calculated using a modified Cholesky decomposition according to:

$$X^T W X a = X^T W y$$
$$Aa = B$$
$$LDL^T a = B$$
$$Lz = B \text{ where } z = DL^T a$$
$$Dx = z \text{ where } x = L^T a$$
$$L^T a = x$$

130. The method according to 127, wherein the weighted least squares algorithm is calculated by QR factorization.
131. The method according to 130, wherein the weighted least squares algorithm is calculated using QR factorization according to:

$$X^T W X a = X^T W y$$
$$\overline{X}^T \overline{X} a = \overline{X}^T \overline{y} \text{ where } QR = \overline{X}$$
$$(QR)^T QRa = (QR)^T \overline{y}$$
$$R^T Q^T QRa = R^T Q^T \overline{y}$$
$$R^T Ra = R^T Q^T \overline{y}$$
$$Ra = Q^T \overline{y}$$

132. The method according to 131, wherein the weighted least squares algorithm is calculated by singular value decomposition.
133. The method according to 132, wherein the weighted least squares algorithm is calculated using singular value decomposition according to:

$$z = U^T y$$
$$\Sigma w = z$$
$$a = Vw,$$

wherein U and V are orthogonal matrices and $\Sigma$ is a diagonal matrix containing singular values of $\overline{X}$.
134. The method according to any one of 114-133, wherein the spectral unmixing matrix is calculated on a field programmable gated array.
135. The method according to any one of 106-134, further comprising identifying the particle in the sample based on the estimated abundance of each fluorophore on the particle.
136. The method according to any one of 106-135, wherein the particle is a cell.
137. The method according to any one of 106-136, wherein each fluorophore is conjugated to a biomolecule.
138. The method according to 137, wherein the biomolecule is a compound selected from the group consisting of a polypeptide, a nucleic acid and a polysaccharide.
139. The method according to any one of 135-138, further comprising sorting the particle based on the estimated abundance of each fluorophore on the particle.
140. The method according to any one of 106-139, further comprising irradiating the sample with a light source.
141. The method according to 140, wherein the light source comprises a laser.
142. The method according to 141, wherein the light source comprises a plurality of lasers.
143. The method according to any one of 106-142, wherein the light detection system comprises a plurality of photodetectors.
144. The method according to 143, wherein the photodetectors comprise one or more photomultiplier tubes.
145. The method according to any one of 106-142, wherein the light detection system comprises a photodetector array.
146. The method according to 145, wherein the photodetector array comprises photodiodes.
147. The method according to 146, wherein the photodetector array comprises charge coupled devices.
148. A system comprising:
a light source configured to irradiate a sample comprising a plurality of fluorophores having overlapping fluorescence spectra;

a light detection system comprising a plurality of photodetectors; and a processor comprising memory operably coupled to the processor wherein the memory comprises instructions stored thereon, which when executed by the processor, cause the processor to estimate an abundance of one or more of the fluorophores on a particle in the sample.

149. The system according to 148, wherein the fluorescence spectra of each fluorophore overlaps with the fluorescence spectra of at least one other fluorophore in the sample.

150. The system according to 149, wherein the fluorescence spectra of each fluorophore overlaps with the fluorescence spectra of at least one other fluorophore in the sample by 10 nm or more.

151. The system according to 149, wherein the fluorescence spectra of each fluorophore overlaps with the fluorescence spectra of at least one other fluorophore in the sample by 25 nm or more.

152. The system according to 148, wherein the fluorescence spectra of at least one fluorophore in the sample overlaps with the fluorescence spectra of two different fluorophores in the sample.

153. The system according to 152, wherein the fluorescence spectra of at least one fluorophore in the sample overlaps with the fluorescence spectra of two different fluorophores in the sample by 10 nm or more.

154. The system according to 152, wherein the fluorescence spectra of at least one fluorophore in the sample overlaps with the fluorescence spectra of two different fluorophores in the sample by 25 nm or more.

155. The system according to any one of 148-154, wherein the memory comprises instructions stored thereon, which when executed by the processor, cause the processor to estimate the abundance of the fluorophores by spectrally resolving the light from each fluorophore on the particle.

156. The system according to 155, wherein the memory comprises instructions stored thereon, which when executed by the processor, cause the processor to calculate a spectral unmixing matrix for the fluorescence spectra of each fluorophore in the sample.

157. The system according to 156, wherein the memory comprises instructions stored thereon, which when executed by the processor, cause the processor to calculate the spectral unmixing matrix by a weighted least squares algorithm.

158. The system according to 157, wherein the weighted least squares algorithm is calculated according to:

$$\hat{a} = (X^T W X)^{-1} X^T W y$$

wherein:
y is measured detector values from the plurality of photodetectors of the light detection system for each cell;
â is estimated fluorophore abundance;
X is spillover; and
W is $$\begin{bmatrix} W_{ii} & 0 & \ldots & 0 \\ 0 & W_{i+1,i+1} & \ldots & 0 \\ \vdots & \vdots & \ddots & \vdots \\ 0 & 0 & \ldots & W_{i+n,i+n} \end{bmatrix}$$

159. The system according to 158, wherein each $W_{ii}$ is calculated according to:

$$W_{ii} = \frac{1}{\sigma_i^2} \approx \frac{1}{y_i + \lambda_i}$$

wherein:
$\sigma_i^2$ is variance at detector i;
$y_i$ is signal at detector i; and
$\lambda_i$ is constant noise at detector i.

160. The system according to any one of 157-159, wherein the memory comprises instructions stored thereon, which when executed by the processor, cause the processor to calculate the spectral unmixing matrix according to:

$$(X^T W X)^{-1} X^T W$$

161. The system according to 160, wherein $(X^T W X)$ is inverted for each cell detected by the light detection system to calculate a spectral unmixing matrix.

162. The system according to 161, wherein the inversion of $(X^T W X)$ is approximated using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

wherein $W_G$ is a predetermined approximation of W that is determined from variance of each photodetector in the light detection system.

163. The system according to 162, wherein variance of the photodetector comprises a photodetector noise component.

164. The system according to 163, wherein the photodetector noise component comprises one or more of electronic noise and optical background light.

165. The system according to any one of 163-164, wherein variance of the photodetector is proportional to measured intensity of light by the photodetector.

166. The system according to any one of 163-164, wherein the photodetector noise component is estimated using a single stain control sample.

167. The system according to any one of 165-166, wherein the memory comprises instructions stored thereon, which when executed by the processor, cause the processor to automatically determine the variance of each photodetector before irradiating the sample with the light source.

168. The system according to any one of 164-167, wherein the memory comprises instructions stored thereon, which when executed by the processor, cause the processor to automatically determine $W_G$ before irradiating the sample with the light source.

169. The system according to 168, wherein the memory comprises instructions stored thereon, which when executed by the processor, cause the processor to calculate $A_0^{-1}$ based on the determined $W_G$ value.

170. The system according to any one of 156-161, wherein the memory comprises instructions stored thereon, which when executed by the processor, cause the processor to approximate ($X^TWX$) using a Sherman-Morrison iterative inverse updater according to:

$$(A_0 + uv^T)^{-1} = A_0^{-1} - \frac{A_0^{-1}uv^T A_0^{-1}}{1 + v^T A_0^{-1} u}.$$

171. The system according to claim 170, wherein $\Delta A_i = X^T \Delta W_i X = a_i m_i m_i^T$ wherein:

$$A = A_0 + \sum_{i=1}^{N_D} \Delta A_i \quad (1)$$

$$= A_0 + \sum_{i=1}^{N_D} \alpha_i m_i m_i^T \quad (2)$$

172. The system according to 171, wherein the memory comprises instructions stored thereon, which when executed by the processor, cause the processor to approximate the spectral unmixing matrix according to:

$$A^{-1} = \left(A_0 + \sum_{i=1}^{N_D} \Delta A_i\right)^{-1} \quad (3)$$

$$= \left(A_0 + \Delta A_1 + \sum_{i=2}^{N_D} \Delta A_i\right)^{-1} \quad (4)$$

$$= \left(A_1 + \sum_{i=2}^{N_D} \Delta A_i\right)^{-1}, \text{etc...} \quad (5)$$

$$A_i^{-1} = (A_{i-1} + \alpha_i m_i m_i^T)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

173. The system according to 172, wherein a precomputed value for $A_0^{-1}$ is used to calculate $A_1^{-1}$ and $A^{-1}$ is calculated by repeat computing of $A_i^{-1}$ using each $(A_{i-1})^{-1}$ from i=1 to $N_D$.

174. The system according to any one of 156-161, wherein the memory comprises instructions stored thereon, which when executed by the processor, cause the processor to calculate the weighted least squares algorithm by matrix decomposition.

175. The system according to 174, wherein the matrix decomposition comprises LU decomposition.

176. The system according to 175, wherein the memory comprises instructions stored thereon, which when executed by the processor, cause the processor to calculate the weighted least squares algorithm using a modified Cholesky decomposition according to:

$$X^T W X a = X^T W y$$

$$Aa = B$$

$$LDL^T a = B$$

$$Lz = B \text{ where } z = DL^T a$$

$$Dx = z \text{ where } x = L^T a$$

$$L^T a = x$$

177. The system according to 174, wherein the memory comprises instructions stored thereon, which when executed by the processor, cause the processor to calculate the weighted least squares algorithm by QR factorization.

178. The system according to 177, wherein the memory comprises instructions stored thereon, which when executed by the processor, cause the processor to calculate the weighted least squares algorithm using QR factorization according to:

$$X^T W X a = X^T W y$$

$$\overline{X}^T \overline{X} a = \overline{X}^T \overline{y} \text{ where } QR = \overline{X}$$

$$(QR)^T QRa = (QR)^T \overline{y}$$

$$R^T Q^T QRa = R^T Q^T \overline{y}$$

$$R^T Ra = R^T Q^T \overline{y}$$

$$Ra = Q^T \overline{y}$$

179. The system according to 174, wherein the memory comprises instructions stored thereon, which when executed by the processor, cause the processor to calculate the weighted least squares algorithm by singular value decomposition.

180. The system according to 179, wherein the memory comprises instructions stored thereon, which when executed by the processor, cause the processor to calculate the weighted least squares algorithm using singular value decomposition according to:

$$z = U^T y$$

$$\Sigma w = z$$

$$a = Vw,$$

wherein U and V are orthogonal matrices and $\Sigma$ is a diagonal matrix containing singular values of $\overline{X}$.

181. The system according to any one of 156-180, wherein the spectral unmixing matrix is calculated on a field programmable gated array.

182. The system according to any one of 148-181, wherein the memory comprises instructions stored thereon, which when executed by the processor, cause the processor to identify the particle in the sample based on the estimated abundance of each fluorophore on the particle.

183. The system according to any one of 148-182, wherein the particle is a cell.

184. The system according to any one of 148-183, wherein each fluorophore is conjugated to a biomolecule.

185. The system according to 184, wherein the biomolecule is a compound selected from the group consisting of a polypeptide, a nucleic acid and a polysaccharide.

186. The system according to any one of 182-185, wherein the memory comprises instructions stored thereon, which when executed by the processor, cause the processor to sort the particle based on the estimated abundance of each fluorophore on the particle.
187. The system according to any one of 148-186, wherein the light source comprises a laser.
188. The system according to 187, wherein the light source comprises a plurality of lasers.
189. The system according to any one of 148-188, wherein the light detection system comprises photomultiplier tubes.
190. The system according to any one of 148-189, wherein the light detection system comprises a photodetector array.
191. The system according to 190, wherein the photodetector array comprises photodiodes.
192. The system according to 190, wherein the photodetector array comprises charge coupled devices.
193. An integrated circuit programmed to estimate an abundance of one or more of the fluorophores on a particle in a sample comprising a plurality of fluorophores having overlapping fluorescence spectra.
194. The integrated circuit according to 193, wherein the fluorescence spectra of each fluorophore overlaps with the fluorescence spectra of at least one other fluorophore in the sample.
195. The integrated circuit according to 194, wherein the fluorescence spectra of each fluorophore overlaps with the fluorescence spectra of at least one other fluorophore in the sample by 10 nm or more.
196. The integrated circuit according to 194, wherein the fluorescence spectra of each fluorophore overlaps with the fluorescence spectra of at least one other fluorophore in the sample by 25 nm or more.
197. The integrated circuit according to 193, wherein the fluorescence spectra of at least one fluorophore in the sample overlaps with the fluorescence spectra of two different fluorophores in the sample.
198. The integrated circuit according to 197, wherein the fluorescence spectra of at least one fluorophore in the sample overlaps with the fluorescence spectra of two different fluorophores in the sample by 10 nm or more.
199. The integrated circuit according to 197, wherein the fluorescence spectra of at least one fluorophore in the sample overlaps with the fluorescence spectra of two different fluorophores in the sample by 25 nm or more.
200. The integrated circuit according to any one of 193-199, wherein the integrated circuit is programmed to estimate the abundance of the fluorophores by spectrally resolving the light from each fluorophore on the particle.
201. The integrated circuit according to any one of 193-199, wherein the integrated circuit is programmed to calculate a spectral unmixing matrix for the fluorescence spectra of each fluorophore in the sample.
202. The integrated circuit according to 201, wherein the integrated circuit is programmed to calculate the spectral unmixing matrix by a weighted least squares algorithm.
203. The integrated circuit according to 202, wherein the weighted least squares algorithm is calculated according to:

$$\hat{a} = (X^T W X)^{-1} X^T W y$$

wherein:

y is measured detector values from the plurality of photodetectors of the light detection system for each cell;

â is estimated fluorophore abundance;

X is spillover; and

W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

204. The integrated circuit according to 202, wherein each $W_{ii}$ is calculated according to:

$$W_{ii} = \frac{1}{\sigma_i^2} \approx \frac{1}{y_i + \lambda_i}$$

wherein:

$\sigma_i^2$ is variance at detector i;

$y_i$ is signal at detector i; and $\lambda_i$ is constant noise at detector i.

205. The integrated circuit according to any one of 202-204, wherein the integrated circuit is programmed to calculate the spectral unmixing matrix according to:

$$(X^T W X)^{-1} X^T W$$

206. The integrated circuit according to 205, wherein $(X^T W X)$ is inverted for each cell detected by the light detection system to calculate a spectral unmixing matrix.
207. The integrated circuit according to 205, wherein the inversion of $(X^T W X)$ is approximated using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

wherein $W_G$ is a predetermined approximation of W that is determined from variance of each photodetector in a light detection system for detecting fluorescence from the fluorophores in the sample.

208. The integrated circuit according to 207, wherein the integrated circuit is programmed to automatically determine $W_G$ before irradiating the sample with the light source.
209. The integrated circuit according to 208, wherein the integrated circuit is programmed to calculate $A_0^{-1}$ based on the determined $W_G$ value.
210. The integrated circuit according to any one of 201-206, wherein the integrated circuit is programmed to approximate $(X^T W X)$ using a Sherman-Morrison iterative inverse updater according to:

$$(A_0 + uv^T)^{-1} = A_0^{-1} - \frac{A_0^{-1}uv^T A_0^{-1}}{1 + v^T A_0^{-1}u}.$$

211. The integrated circuit according to 210, wherein $\Delta A_i = X^T \Delta W_i X = \alpha_i m_i m_i^T$ wherein:

$$A = A_0 + \sum_{i=1}^{N_D} \Delta A_i \quad (1)$$

$$= A_0 + \sum_{i=1}^{N_D} \alpha_i m_i m_i^T \quad (2)$$

212. The integrated circuit according to 211, wherein the integrated circuit is programmed to approximate the spectral unmixing matrix according to:

$$A^{-1} = \left(A_0 + \sum_{i=1}^{N_D} \Delta A_i\right)^{-1} \quad (3)$$

$$= \left(A_0 + \Delta A_1 + \sum_{i=2}^{N_D} \Delta A_i\right)^{-1} \quad (4)$$

$$= \left(A_1 + \sum_{i=2}^{N_D} \Delta A_i\right)^{-1}, \text{etc...} \quad (5)$$

$$A_i^{-1} = (A_{i-1} + \alpha_i m_i m_i^T)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

213. The integrated circuit according to 212, wherein a precomputed value for $A_0^{-1}$ is used to calculate $A_1^{-1}$ and $A^{-1}$ is calculated by repeat computing of $A_i^{-1}$ using each $(A_{i-1})^{-1}$ from i=1 to $N_D$.

214. The integrated circuit according to any one of 201-206, wherein the integrated circuit is programmed to calculate the weighted least squares algorithm by matrix decomposition.

215. The integrated circuit according to 214, wherein the matrix decomposition comprises LU decomposition.

216. The integrated circuit according to 215, wherein the integrated circuit is programmed to calculate the weighted least squares algorithm using a modified Cholesky decomposition according to:

$$X^T W X a = X^T W y$$

$$Aa = B$$

$$LDL^T a = B$$

$$Lz = B \text{ where } z = DL^T a$$

$$Dx = z \text{ where } x = L^T a$$

$$L^T a = x$$

217. The integrated circuit according to 214, wherein the integrated circuit is programmed to calculate the weighted least squares algorithm by QR factorization.

218. The integrated circuit according to 217, wherein the integrated circuit is programmed to calculate the weighted least squares algorithm using QR factorization according to:

$$X^T W X a = X^T W y$$

$$\overline{X}^T \overline{X} a = \overline{X}^T \overline{y} \text{ where } QR = \overline{X}$$

$$(QR)^T QRa = (QR)^T \overline{y}$$

$$R^T Q^T QRa = R^T Q^T \overline{y}$$

$$R^T Ra = R^T Q^T \overline{y}$$

$$Ra = Q^T \overline{y}$$

219. The integrated circuit according to 218, wherein the integrated circuit is programmed to calculate the weighted least squares algorithm by singular value decomposition.

220. The integrated circuit according to 219, wherein the integrated circuit is programmed to calculate the weighted least squares algorithm using singular value decomposition according to:

$$z = U^T y$$

$$\Sigma w = z$$

$$a = Vw,$$

wherein U and V are orthogonal matrices and $\Sigma$ is a diagonal matrix containing singular values of $\overline{X}$.

221. The integrated circuit according to any one of 193-220, wherein the integrated circuit is programmed to identify the particle in the sample based on the estimated abundance of each fluorophore on the particle.

222. The integrated circuit according to 221, wherein the integrated circuit is programmed to to sort the particle based on the estimated abundance of each fluorophore on the particle.

223. The integrated circuit according to any one of 193-222, wherein the integrated circuit is a field programmable gate array (FPGA).

224. The integrated circuit according to any one of 193-222, wherein the integrated circuit is an application specific integrated circuit (ASIC).

225. The integrated circuit according to any one of 193-222, wherein the integrated circuit is a complex programmable logic device (CPLD).

226. A system comprising:
a light source configured to irradiate a sample comprising a plurality of fluorophores;
a light detection system comprising a plurality of photodetectors; and
a processor comprising memory operably coupled to the processor wherein the memory comprises instructions stored thereon, which when executed by the processor, cause the processor to:
calculate a spectral unmixing matrix for the fluorescence spectra of the plurality of fluorophores for each cell detected by the light detection system; and estimate the abundance of each fluorophore using the spectral unmixing matrix; and
a cell sorting component that is configured to sort cells in the sample based on the estimated fluorophore abundance.

227. The system according to 226, wherein the memory comprises instructions stored thereon, which when executed by the processor, cause the processor to calculate the spectral unmixing matrix by a weighted least squares algorithm.

228. The system according to 227, wherein the weighted least squares algorithm is calculated according to:

$$\hat{a} = (X^T W X)^{-1} X^T W y$$

wherein:
y is measured detector values from the plurality of photodetectors of the light detection system for each cell;
â is estimated fluorophore abundance;
X is spillover; and
W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

229. The system according to 228, wherein each $W_{ii}$ is calculated according to:

$$W_{ii} = \frac{1}{\sigma_i^2} \approx \frac{1}{y_i + \lambda_i}$$

wherein:
$\sigma_i^2$ is variance at detector i;
$y_i$ is signal at detector i; and
$\lambda_i$ is constant noise at detector i.

230. The system according to 228, wherein the spectral unmixing matrix is calculated according to:

$$(X^T W X)^{-1} X^T W$$

231. The system according to 228, wherein ($X^T W X$) is inverted for each cell detected by the light detection system to calculate a spectral unmixing matrix.

232. The system according to 231, wherein the inversion of ($X^T W X$) is approximated using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

wherein $W_G$ is a predetermined approximation of W that is determined from variance of each photodetector in the light detection system.

233. The system according to 232, wherein variance of the photodetector comprises a photodetector noise component.

234. The system according to 233, wherein the photodetector noise component comprises one or more of electronic noise and optical background light.

235. The system according to any one of 233-234, wherein variance of the photodetector is proportional to measured intensity of light by the photodetector.

236. The system according to any one of 233-235, wherein the photodetector noise component is estimated using a single stain control sample.

237. The system according to any one of 233-236, wherein the memory comprises instructions stored thereon, which when executed by the processor, cause the processor to automatically determine the variance of each photodetector before irradiating the sample with the light source.

238. The system according to any one of 232-237, wherein the memory comprises instructions stored thereon, which when executed by the processor, cause the processor to automatically determine $W_G$ before irradiating the sample with the light source.

239. The system according to 238, wherein the memory comprises instructions stored thereon, which when executed by the processor, cause the processor to calculate $A_0^{-1}$ based on the determined $W_G$ value.

240. The system according to 239, wherein the memory comprises instructions stored thereon, which when executed by the processor, cause the processor to calculate $A_0^{-1}$ based on the determined $W_G$ value.

241. The system according to any one of 227-231, wherein the memory comprises instructions stored thereon, which when executed by the processor, cause the processor to approximate ($X^T W X$) using a Sherman-Morrison iterative inverse updater according to:

$$(A_0 + uv^T)^{-1} = A_0^{-1} - \frac{A_0^{-1} uv^T A_0^{-1}}{1 + v^T A_0^{-1} u}.$$

242. The system according to 241, wherein $\Delta A_i = X^T \Delta W_i X = \alpha_i m_i m_i^T$ wherein:

$$A = A_0 + \sum_{i=1}^{N_D} \Delta A_i \quad (1)$$

$$= A_0 + \sum_{i=1}^{N_D} \alpha_i m_i m_i^T \quad (2)$$

243. The system according to 242, wherein the memory comprises instructions stored thereon, which when executed by the processor, cause the processor to approximate the spectral unmixing matrix according to:

$$A^{-1} = \left( A_0 + \sum_{i=1}^{N_D} \Delta A_i \right)^{-1} \quad (3)$$

$$= \left( A_0 + \Delta A_i + \sum_{i=2}^{N_D} \Delta A_i \right)^{-1} \quad (4)$$

-continued $$= \left(A_i + \sum_{i=2}^{N_D} \Delta A_i\right)^{-1}, \text{etc...} \quad (5)$$

$$A_i^{-1} = (A_{i-1} + \alpha_i m_i m_i^T)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

244. The system according to 243, wherein a precomputed value for $A_0^{-1}$ is used to calculate $A_1^{-1}$ and $A^{-1}$ is calculated by repeat computing of $A_i^{-1}$ using each $(A_{i-1})^{-1}$ from i=1 to $N_D$.

245. The system according to any one of 227-231, wherein the memory comprises instructions stored thereon, which when executed by the processor, cause the processor to calculate the weighted least squares algorithm by matrix decomposition.

246. The system according to 245, wherein the matrix decomposition comprises LU decomposition.

247. The system according to 246, wherein the memory comprises instructions stored thereon, which when executed by the processor, cause the processor to calculate the weighted least squares algorithm using a modified Cholesky decomposition according to:

$$X^T W X a = X^T W y$$
$$Aa = B$$
$$LDL^T a = B$$
$$Lz = B \text{ where } z = DL^T a$$
$$Dx = z \text{ where } x = L^T a$$
$$L^T a = x$$

248. The system according to 245, wherein the memory comprises instructions stored thereon, which when executed by the processor, cause the processor to calculate the weighted least squares algorithm by QR factorization.

249. The system according to 248, wherein the memory comprises instructions stored thereon, which when executed by the processor, cause the processor to calculate the weighted least squares algorithm using QR factorization according to:

$$X^T W X a = X^T W y$$
$$\overline{X}^T \overline{X} a = \overline{X}^T \overline{y} \text{ where } QR = \overline{X}$$
$$(QR)^T QRa = (QR)^T \overline{y}$$
$$R^T Q^T QRa = R^T Q^T \overline{y}$$
$$R^T Ra = R^T Q^T \overline{y}$$
$$Ra = Q^T \overline{y}$$

250. The system according to 245, wherein the memory comprises instructions stored thereon, which when executed by the processor, cause the processor to calculate the weighted least squares algorithm by singular value decomposition.

251. The system according to 250, wherein the memory comprises instructions stored thereon, which when executed by the processor, cause the processor to calculate the weighted least squares algorithm using singular value decomposition according to:

$$z = U^T y$$
$$\sum w = z$$
$$a = Vw,$$

wherein U and V are orthogonal matrices and $\Sigma$ is a diagonal matrix containing singular values of $\overline{X}$.

252. The system according to any one of 226-251, wherein the spectral unmixing matrix is calculated on a field programmable gated array.

253. The system according to any one of 226-252, wherein the light source comprises a laser.

254. The system according to 253, wherein the light source comprises a plurality of lasers.

255. The system according to any one of 226-254, wherein the light detection system comprises photomultiplier tubes.

256. The system according to any one of 226-255, wherein the light detection system comprises a photodetector array.

257. The system according to 256, wherein the photodetector array comprises photodiodes.

258. The system according to 256, wherein the photodetector array comprises charge coupled devices.

259. The system according to any one of 226-258, wherein the cell sorting component comprises a droplet deflector.

260. The system according to any one of 226-259, wherein the system further comprises:
a flow cell nozzle comprising an orifice; and
a sample interrogation region in fluid communication with the flow cell nozzle orifice for irradiating the sample with the light source.

261. The system according to 260, further comprising a cuvette positioned in the sample interrogation region.

262. A method for sorting cells of a sample, the method comprising:
detecting light emitted from a sample comprising a plurality of fluorophores with a light detection system comprising a plurality of photodetectors;
calculating a spectral unmixing matrix for the fluorescence spectra of the plurality of fluorophores for each cell detected by the light detection system;
estimating the abundance of each fluorophore using the spectral unmixing matrix; and
sorting cells in the sample based on the estimated fluorophore abundance.

263. The method according to 262, wherein the method comprises calculating the spectral unmixing matrix using a a weighted least squares algorithm.

264. The method according to 263, wherein the weighted least squares algorithm is calculated according to:

$$\hat{a} = (X^T W X)^{-1} X^T W y$$

wherein:
y is measured detector values from the plurality of photodetectors of the light detection system for each cell;
â is estimated fluorophore abundance;
X is spillover; and
W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

265. The method according to 264, wherein each $W_{ii}$ is calculated according to:

$$W_{ii} = \frac{1}{\sigma_i^2} \approx \frac{1}{y_i + \lambda_i}$$

wherein:
$\sigma_i^2$ is variance at detector i;
$y_i$ is signal at detector i; and
$\lambda_i$ is constant noise at detector i.

266. The method according to 264, wherein the method comprises calculating the spectral unmixing matrix according to:

$$(X^T W X)^{-1} X^T W$$

267. The method according to 264, wherein the method comprises inverting ($X^T W X$) for each cell detected by the light detection system to calculate a spectral unmixing matrix.

268. The method according to 267, wherein inverting ($X^T W X$) comprises approximating ($X^T W X$) using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

wherein $W_G$ is a predetermined approximation of W that is determined from variance of each photodetector in the light detection system.

269. The method according to 268, further comprising precomputing $A_0^{-1}$ with the calculated $W_G$ value.

270. The method according to any one of 263-267, wherein the method comprises approximating ($X^T W X$) using a Sherman-Morrison iterative inverse updater according to:

$$(A_0 + uv^T)^{-1} = A_0^{-1} - \frac{A_0^{-1} uv^T A_0^{-1}}{1 + v^T A_0^{-1} u}.$$

271. The method according to 270, wherein $\Delta A_i = X^T \Delta W_i X = \alpha_i m_i m_i^T$ wherein:

$$A = A_0 + \sum_{i=1}^{N_D} \Delta A_i \quad (1)$$

$$= A_0 + \sum_{i=1}^{N_D} \alpha_i m_i m_i^T \quad (2)$$

272. The method according to 271, further comprising approximating the spectral unmixing matrix according to:

$$A^{-1} = \left(A_0 + \sum_{i=1}^{N_D} \Delta A_i\right)^{-1} \quad (3)$$

$$= \left(A_0 + \Delta A_1 + \sum_{i=2}^{N_D} \Delta A_i\right)^{-1} \quad (4)$$

$$= \left(A_1 + \sum_{i=2}^{N_D} \Delta A_i\right)^{-1}, \text{etc...} \quad (5)$$

$$A_i^{-1} = \left(A_{i-1} + \alpha_i m_i m_i^T\right)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

273. The method according to 272, wherein a precomputed value for $A_0^{-1}$ is used to calculate $A_1^{-1}$ and $A^{-1}$ is calculated by repeat computing of $A_i^{-1}$ using each $(A_{i-1})^{-1}$ from i=1 to $N_D$.

274. The method according to any one of 263-267, wherein the weighted least squares algorithm is calculated by matrix decomposition.

275. The method according to 274, wherein the matrix decomposition comprises LU decomposition.

276. The method according to 275, wherein the weighted least squares algorithm is calculated using a modified Cholesky decomposition according to:

$$X^T W X a = X^T W y$$
$$Aa = B$$
$$LDL^T a = B$$
$$Lz = B \text{ where } z = DL^T a$$
$$Dx = z \text{ where } x = L^T a$$
$$L^T a = x$$

277. The method according to 274, wherein the weighted least squares algorithm is calculated by QR factorization.

278. The method according to 277, wherein the weighted least squares algorithm is calculated using QR factorization according to:

$$X^T W X a = X^T W y$$
$$\overline{X}^T \overline{X} a = \overline{X}^T \overline{y} \text{ where } QR = \overline{X}$$
$$(QR)^T QR a = (QR)^T \overline{y}$$

-continued
$$R^T Q^T Q R a = R^T Q^T \bar{y}$$
$$R^T R a = R^T Q^T \bar{y}$$
$$R a = Q^T \bar{y}$$

279. The method according to 274, wherein the weighted least squares algorithm is calculated by singular value decomposition.
280. The method according to 279, wherein the weighted least squares algorithm is calculated using singular value decomposition according to:

$$z = U^T y$$
$$\Sigma w = z$$
$$a = Vw,$$

wherein U and V are orthogonal matrices and $\Sigma$ is a diagonal matrix containing singular values of X.
281. The method according to 268, wherein variance of the photodetector comprises a photodetector noise component.
282. The method according to 281, wherein the photodetector noise component comprises one or more of electronic noise and optical background light.
283. The method according to any one of 281-282, wherein variance of the photodetector is proportional to measured intensity of light by the photodetector.
284. The method according to any one of 281-283, further comprising estimating the photodetector noise components using a single stain control sample.
285. The method according to any one of 281-284, further comprising determining the variance of each photodetector before irradiating the sample with the light source.
286. The method according to any one of 268-285, further comprising determining $W_G$ before irradiating the sample with the light source.
287. The method according to any one of 262-286, wherein the spectral unmixing matrix is calculated on a field programmable gated array.
288. The method according to any one of 262-287, further comprising irradiating the sample with a light source.
289. The method according to 288, wherein the light source comprises a laser.
290. The method according to 289, wherein the light source comprises a plurality of lasers.
291. The method according to any one of 262-290, wherein emitted light is detected with a plurality of photodetectors comprising photomultiplier tubes.
292. The method according to any one of 262-290, wherein emitted light is detected with a photodetector array.
293. The method according to 292, wherein the photodetector array comprises photodiodes.
294. The method according to 292, wherein the photodetector array comprises charge coupled devices.
295. A field programmable gate array programmed to:
calculate a spectral unmixing matrix for fluorescence spectra of a plurality of fluorophores for each cell in a sample detected by a light detection system having a plurality of photodetectors; and
estimate the abundance of each fluorophore using the spectral unmixing matrix.
296. The field programmable gate array according to 295, wherein the field programmable gate array is configured to calculate the spectral unmixing matrix using a weighted least squares algorithm.
297. The field programmable gate array according to 296, wherein the weighted least squares algorithm is calculated according to:

$$\hat{a} = (X^T W X)^{-1} X^T W y$$

wherein:
y is measured detector values from the plurality of photodetectors of the light detection system for each cell;
$\hat{a}$ is estimated fluorophore abundance;
X is spillover; and
W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

298. The field programmable gate array according to 297, wherein each $W_{ii}$ is calculated according to:

$$W_{ii} = \frac{1}{\sigma_i^2} \approx \frac{1}{y_i + \lambda_i}$$

wherein:
$\sigma_i^2$ is variance at detector i;
$y_i$ is signal at detector i; and
$\lambda_i$ is constant noise at detector i.
299. The field programmable gate array according to 295, wherein the field programmable gate array is configured to calculate the spectral unmixing matrix according to:

$$(X^T W X)^{-1} X^T W$$

300. The field programmable gate array according to 297, wherein the field programmable gate array is configured to invert $(X^T W X)$ for each cell detected to calculate a spectral unmixing matrix.
301. The field programmable gate array according to 300, wherein the field programmable gate array is configured to invert $(X^T W X)$ by approximating $(X^T W X)$ using an iterative Newton-Raphson calculation according to:

$$A^{-1} = (X^T W X)^{-1};$$
$$A_0^{-1} = (X^T W_G X)^{-1}$$
$$A_{i+1}^{-1} = (2I - A_i^{-1} A) A_i^{-1}$$

wherein $W_G$ is a predetermined approximation of W that is determined from variance of each photodetector in the light detection system.

302. The field programmable gate array according to 301, wherein the integrated circuit is programmed to automatically determine $W_G$ before irradiating the sample with the light source.

303. The field programmable gate array according to 302, wherein the integrated circuit is programmed to calculate $A_0^{-1}$ based on the determined $W_G$ value.

304. The field programmable gate array according to any one of 296-300, wherein the field programmable gate array is programmed to approximate $(X^T W X)$ using a Sherman-Morrison iterative inverse updater according to:

$$(A_0 + uv^T)^{-1} = A_0^{-1} - \frac{A_0^{-1} uv^T A_0^{-1}}{1 + v^T A_0^{-1} u}.$$

305. The field programmable gate array according to 304, wherein $\Delta A_i = X^T \Delta W_i X = a_i m_i m_i^T$ wherein:

$$A = A_0 + \sum_{i=1}^{N_D} \Delta A_i \quad (1)$$

$$= A_0 + \sum_{i=1}^{N_D} \alpha_i m_i m_i^T \quad (2)$$

306. The field programmable gate array according to 305, wherein the integrated circuit is programmed to approximate the spectral unmixing matrix according to:

$$A^{-1} = \left(A_0 + \sum_{i=1}^{N_D} \Delta A_i\right)^{-1} \quad (3)$$

$$= \left(A_0 + \Delta A_1 + \sum_{i=2}^{N_D} \Delta A_i\right)^{-1} \quad (4)$$

$$= \left(A_1 + \sum_{i=2}^{N_D} \Delta A_i\right)^{-1}, \text{etc...} \quad (5)$$

$$A_i^{-1} = (A_{i-1} + \alpha_i m_i m_i^T)^{-1} \quad (6)$$

$$= A_{i-1}^{-1} - \frac{A_{i-1}^{-1} \alpha_i m_i m_i^T A_{i-1}^{-1}}{1 + \alpha_i m_i^T A_{i-1}^{-1} m_i} \quad (7)$$

$$= A_{i-1}^{-1} - \frac{\alpha_i}{1 + \alpha_i m_i^T A_{i-1}^{-1} m_i} A_{i-1}^{-1} m_i m_i^T A_{i-1}^{-1} \quad (8)$$

307. The field programmable gate array according to 306, wherein a precomputed value for $A_0^{-1}$ is used to calculate $A_1^{-1}$ and $A^{-1}$ is calculated by repeat computing of $A_i^{-1}$ using each $(A_{i-1})^{-1}$ from i=1 to $N_D$.

308. The field programmable gate array according to any one of 296-300, wherein the integrated circuit is programmed to calculate the weighted least squares algorithm by matrix decomposition.

309. The field programmable gate array according to 308, wherein the matrix decomposition comprises LU decomposition.

310. The field programmable gate array according to 309, wherein the integrated circuit is programmed to calculate the weighted least squares algorithm using a modified Cholesky decomposition according to:

$$X^T W X a = X^T W y$$

$$A a = B$$

$$L D L^T a = B$$

$$L z = B \text{ where } z = D L^T a$$

$$D x = z \text{ where } x = L^T a$$

$$L^T a = x$$

311. The field programmable gate array according to 310, wherein the integrated circuit is programmed to calculate the weighted least squares algorithm by QR factorization.

312. The field programmable gate array according to 311, wherein the integrated circuit is programmed to calculate the weighted least squares algorithm using QR factorization according to:

$$X^T W X a = X^T W y$$

$$\overline{X}^T \overline{X} a = \overline{X}^T \overline{y} \text{ where } QR = \overline{X}$$

$$(QR)^T QR a = (QR)^T \overline{y}$$

$$R^T Q^T QR a = R^T Q^T \overline{y}$$

$$R^T R a = R^T Q^T \overline{y}$$

$$R a = Q^T \overline{y}$$

313. The field programmable gate array according to 312, wherein the integrated circuit is programmed to calculate the weighted least squares algorithm by singular value decomposition.

314. The field programmable gate array according to 313, wherein the integrated circuit is programmed to calculate the weighted least squares algorithm using singular value decomposition according to:

$$z = U^T y$$

$$\Sigma w = z$$

$$a = V w,$$

wherein U and V are orthogonal matrices and $\Sigma$ is a diagonal matrix containing singular values of $\overline{X}$.

315. The field programmable gate array according to 301, wherein variance of the photodetector comprises a photodetector noise component.

316. The field programmable gate array according to 315, wherein the photodetector noise component comprises one or more of electronic noise and optical background light.

317. The field programmable gate array according to any one of 295-316, wherein variance of the photodetector is proportional to measured intensity of light by the photodetector.

318. The field programmable gate array according to any one of 295-316, wherein the field programmable gate array is programmed with an estimate of the photodetector noise components based on a single stain control sample.

319. The field programmable gate array according to any one of 295-316, wherein the variance of each photodetector is programmed to the field programmable gate array before the sample is irradiated with a light source.

320. The field programmable gate array according to any one of 295-316, wherein $W_G$ is programmed to the field programmable gate array before the sample is irradiated with a light source.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method comprising:
   detecting light with a light detection system from a sample comprising a plurality of fluorophores having overlapping fluorescence spectra; and
   estimating an abundance of one or more of the fluorophores on a particle in the sample using a weighted spectrally resolving light from each fluorophore in the sample using a weighted least squares algorithm comprising a Cholesky decomposition according to:

$$X^T W X_a = X^T W y$$

wherein:
   Aa=B
   $LDL^T$a=B LDL decomposition
   Lz=B where $Z=DL^T$a Lower-triangular matrix solution
   Dx=z where $x=L^T$a Diagonal matrix solution
   $L^T$a=x Upper-triangular matrix solution.

2. The method according to claim 1, wherein the fluorescence spectra of each fluorophore overlaps with the fluorescence spectra of at least one other fluorophore in the sample by 10 nm or more.

3. The method according to claim 1, wherein the fluorescence spectra of at least one fluorophore in the sample overlaps with the fluorescence spectra of two different fluorophores in the sample.

4. The method according to claim 3, wherein the fluorescence spectra of at least one fluorophore in the sample overlaps with the fluorescence spectra of two different fluorophores in the sample by 10 nm or more.

5. The method according to claim 1, further comprising sorting the particle based on the estimated abundance of each fluorophore on the particle.

6. A system comprising:
   a light source configured to irradiate a sample comprising a plurality of fluorophores having overlapping fluorescence spectra;
   a light detection system comprising a plurality of photodetectors; and
   a processor comprising memory operably coupled to the processor wherein the memory comprises instructions stored thereon, which when executed by the processor, cause the processor to estimate an abundance of one or more of the fluorophores on a particle in the sample using a weighted least squares algorithm comprising a Cholesky decomposition according to:

$$X^T W X_a = X^T W y$$

wherein:
   Aa=B
   $LDL^T$a=B LDL decomposition
   Lz=B where $Z=DL^T$a Lower-triangular matrix solution
   Dx=z where $x=L^T$a Diagonal matrix solution
   $L^T$a=x Upper-triangular matrix solution.

7. The system according to claim 6, wherein the fluorescence spectra of each fluorophore overlaps with the fluorescence spectra of at least one other fluorophore in the sample.

8. The system according to 7, wherein the fluorescence spectra of each fluorophore overlaps with the fluorescence spectra of at least one other fluorophore in the sample by 10 nm or more.

9. The system according to claim 6, wherein the fluorescence spectra of at least one fluorophore in the sample overlaps with the fluorescence spectra of two different fluorophores in the sample.

10. The system according to claim 9, wherein the fluorescence spectra of at least one fluorophore in the sample overlaps with the fluorescence spectra of two different fluorophores in the sample by 10 nm or more.

11. The system according to claim 6, wherein the memory comprises instructions stored thereon, which when executed by the processor, cause the processor to:
    sort the particle based on the estimated abundance of each fluorophore on the particle.

12. The system according to claim 11, further comprising a cell sorting component that is configured to sort cells in the sample based on the estimated fluorophore abundance.

* * * * *